(12) United States Patent
Sudo

(10) Patent No.: US 7,965,324 B2
(45) Date of Patent: Jun. 21, 2011

(54) VIDEO-SIGNAL-PROCESSING DEVICE, IMAGING APPARATUS USING THE SAME, AND METHOD FOR PROCESSING VIDEO SIGNAL

(75) Inventor: Fumihiko Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1331 days.

(21) Appl. No.: 11/511,487

(22) Filed: Aug. 29, 2006

(65) Prior Publication Data

US 2007/0046793 A1    Mar. 1, 2007

(30) Foreign Application Priority Data

Aug. 30, 2005   (JP) ................................ 2005-250312

(51) Int. Cl.
  *H04N 9/68* (2006.01)
  *H04N 5/228* (2006.01)
  *H04N 5/235* (2006.01)
(52) U.S. Cl. .................. 348/234; 348/222.1; 348/229.1; 348/230.1
(58) Field of Classification Search ............... 348/222.1, 348/229.1, 230.1, 234, 236, 237, 238, 241, 348/242, 362; 182/162, 166, 254, 270, 273, 182/274; 382/162, 166, 254, 270, 273, 274
See application file for complete search history.

(56) References Cited

U.S. PATENT DOCUMENTS

| 5,555,031 | A  | * | 9/1996  | Van Rooij ..................... 348/645 |
| 6,111,607 | A  |   | 8/2000  | Kameyama |
| 6,762,793 | B1 | * | 7/2004  | Fukushima et al. .......... 348/254 |
| 6,972,793 | B1 | * | 12/2005 | Kameyama ................... 348/256 |
| 7,447,356 | B2 | * | 11/2008 | Ohsawa et al. ............... 382/167 |

FOREIGN PATENT DOCUMENTS

JP    3509448    1/2004

* cited by examiner

*Primary Examiner* — David L Ometz
*Assistant Examiner* — Peter Chon
(74) *Attorney, Agent, or Firm* — Oblon, Spivak, McClelland, Maier & Neustadt, L.L.P.

(57) ABSTRACT

A video-signal-processing device has luminance conversion section that performs level compression on three input primary-color signals of a color video signal at a same luminance adjustment compression ratio with a hue and a saturation of the color video signal being kept constant, thereby generating three compressed primary-color signals. The device also has saturation conversion section that performs level conversion on the three compressed primary-color signals by using a saturation compression ratio if a maximum level of at least one of the three compressed primary-color signals exceeds a first level. The saturation conversion section sets the saturation compression ratio by using a minimum level one of the three compressed primary-color signals.

9 Claims, 17 Drawing Sheets

(rc=0)

(rc=1)

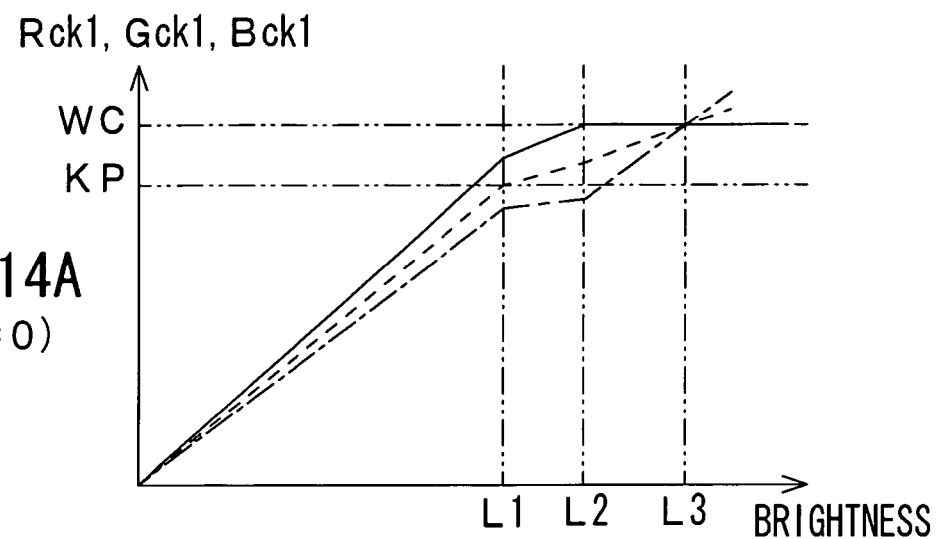
FIG. 14A (rs=0)
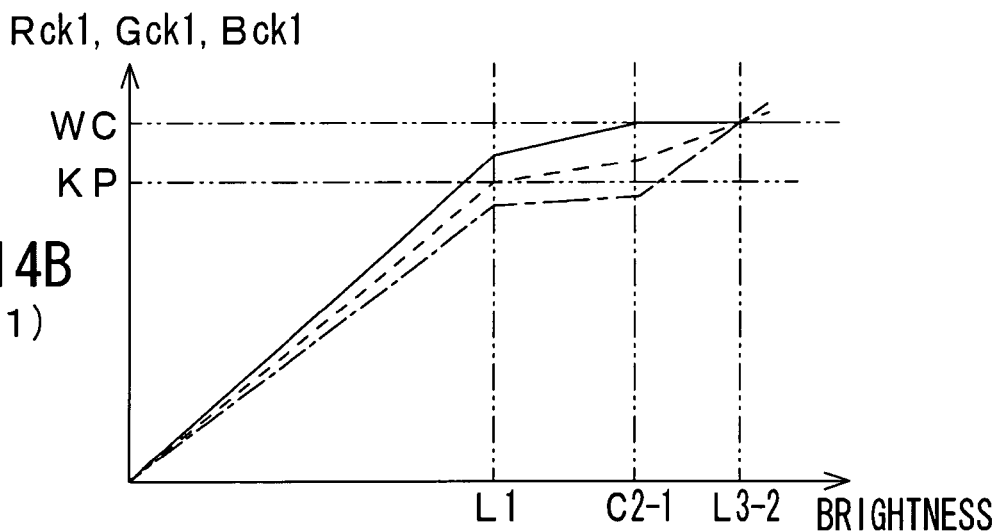
FIG. 14B (rs=1)

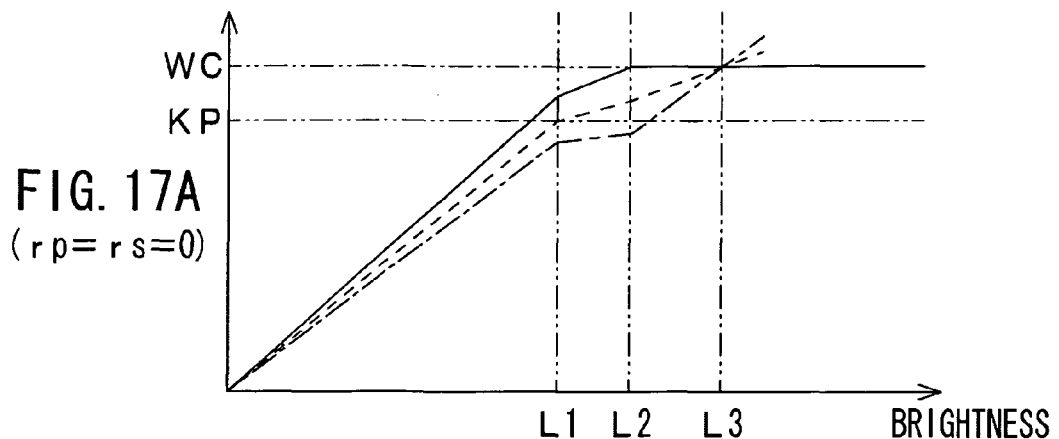
FIG. 17A (rp=rs=0)
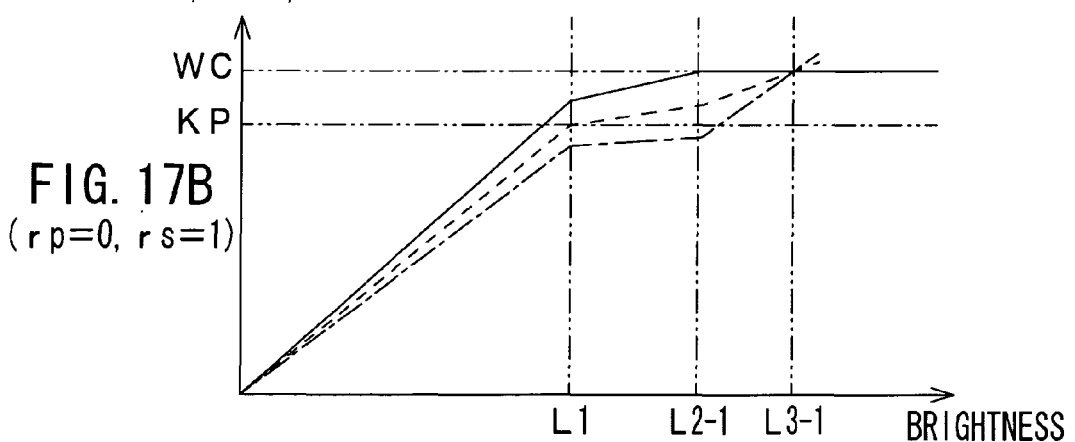
FIG. 17B (rp=0, rs=1)
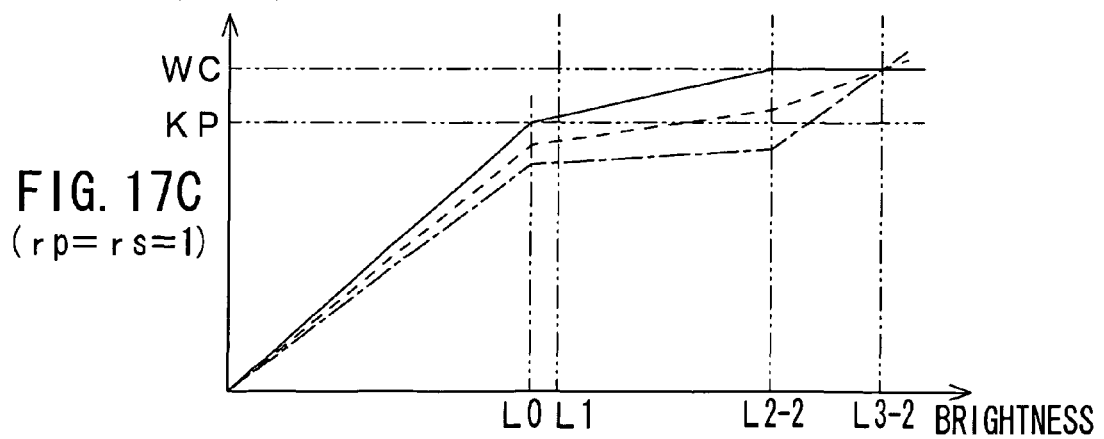
FIG. 17C (rp=rs=1)

VIDEO-SIGNAL-PROCESSING DEVICE, IMAGING APPARATUS USING THE SAME, AND METHOD FOR PROCESSING VIDEO SIGNAL

CROSS REFERENCE TO RELATED APPLICATION

The present invention contains subject matter related to Japanese Patent Application JP 2005-250312 filed in the Japanese Patent Office on Aug. 30, 2005, the entire contents of which being incorporated herein by reference.

BACKGROUND OF THE INVENTION

1. Field of the Invention

The present invention relates to a video-signal-processing device, an imaging apparatus using the same, a method for processing a video signal, and a program product therefor.

2. Description of Related Art

When taking an image, an imaging apparatus has performed any Knee correction to compress highlight areas of an imaging signal output from an image pick-up device into its dynamic range (saturation signal quantity) and outputs it as a video signal having such a dynamic range as to comply with the broadcast standards.

According to this Knee correction, if an input signal Ein is less than a Knee point level KP, an uncompressed output signal Eout can be obtained as expressed in a following Equation (1); and if the input signal Ein is of the Knee point level KP or higher, as expressed in a following Equation (2), the input signal Ein is subject to compression processing by using a compression ratio (Knee slope) KS, thereby generating the output signal Eout.

$$Eout = Ein (Ein < KP) \quad (1)$$

$$Eout = KP + KS(Ein - KP)(Ein \geq KP) \quad (2)$$

It is noted that FIG. 1 shows characteristics of the Knee saturation.

If performing such the Knee correction on each of the three primary-color signals Rin, Gin, and Bin, as shown in FIG. 2, a Knee correction section 10 is equipped with a level conversion section as well as clip sections 12r, 12g, and 12b; with this, the level conversion section 11 compresses the three primary-color signals Rin, Gin, and Bin to generate three primary-color signals Rkn, Gkn, and Bkn, and then, the clip sections 12r, 12g, and 12b respectively clip the three primary-color signals Rkn, Gkn, and Bkn by a white clip level WC to have their levels fall within a level range that conforms to the broadcast standards.

FIG. 3 shows characteristics of a Knee correction section according to related art, indicating signal processing results obtained by performing the Knee correction and clip processing on each of the color signals. It is noted that in FIG. 3, for example, a red color signal Rout is indicated by a solid line, a green color signal Gout is indicated by a dotted line, and a blue color signal Bout is indicated by a dash-and-dot line (and so on).

With this, if a subject has a higher luminance and, for example, the red color signal Rin reaches the Knee point level KP or higher, only level compression of the color signal Rin is performed. Accordingly, if a proportion among the color signals Rout, Gout, and Bout is changed, a hue is changed. If the subject has an even higher luminance and, for example, the color signal Gin reaches the Knee point level KP or higher, level compression is performed on the color signals Rin and Gin. Accordingly, also when the color Gin reaches the Knee point level KP or higher, the hue is changed. Further, if the color signal Rin that has undergone level compression reaches the white clip level WC, clip processing is performed thereon to restrict the color signal Rout to the white clip level WC. Therefore, in this case also, the proportion among the color signals Rout, Gout, and Bout is changed, and the hue is also changed. Similarly, also when the color signal Gin that has undergone level compression reaches the white clip level WC, the color signal Gout is restricted to the white clip level WC, so that the hue is changed.

Japanese Patent Publication No. 3509448 discloses a video-signal-processing device in which even if any Knee correction or clip processing is performed on the three primary-color signals, an arrangement is carried out so that a hue of an image based on the post-Knee correction or post-clip processing of three primary-color signals may be kept constant.

If the hue of an image based on the post-Knee correction or the post-clip processing of three primary-color signals is kept constant by using the video-signal-processing device disclosed in the above Japanese Patent, a saturation decreases in a bright area thereof to fade their colors as compared with a case where the Knee correction or clip processing is performed thereon as shown in FIG. 3.

FIG. 4 shows a configuration of such the video-signal-processing device. The three primary-color signals Rin, Gin, and Bin are respectively supplied to a luminance signal generation circuit 21 and the respective multipliers 24r, 24g, and 24b in a luminance conversion section 20. The luminance signal generation circuit 21 receives the three primary-color signals Rin, Gin, and Bin to generate a luminance signal Yin and supplies it to a luminance Knee correction circuit 22 and a divider 23. The luminance Knee correction circuit 22 performs any Knee correction on the luminance signal Yin and supplies a post-Knee correction luminance signal Yyk to the divider 23, subtracters 32, 33, 35r, 35g, and 35b, and adders 37r, 37g, and 37b.

The divider 23 divides the luminance signal Yyk by the luminance signal Yin to calculate a luminance adjustment compression ratio KY (=Yyk/Yin) and supplies it to the multipliers 24r, 24g, and 24b.

The multipliers 24r, 24g, and 24b multiply the three primary-color signals Rin, Gin, and Bin with the luminance adjustment compression ratio KY to generate three primary-color signals Ryk, Gyk, and Byk, respectively.

In other words, the three primary-color signals Ryk, Gyk, and Byk are obtained as a result of computations of following Equations (3) through (5), respectively. Therefore, even if level compression is performed, the hue can be kept constant.

$$Ryk = (Yyk/Yin)*Rin \quad (3)$$

$$Gyk = (Yyk/Yin)*Gin \quad (4)$$

$$Byk = (Yyk/Yin)*Bin \quad (5)$$

The three primary-color signals Ryk, Gyk, and Byk are respectively supplied to a maximum-value signal setting circuit 31 and the subtracters 35r, and 35g, and 35b in a saturation conversion section 30. The maximum-value signal setting circuit 31 selects a highest level one among the three primary-color signals Ryk, Gyk, and Byk and supplies this selected color signal as a maximum-value signal DMAX to the subtracter 32. The subtracter 32 subtracts the luminance signal Yyk from the maximum-value signal DMAX and supplies a subtraction result (DMAX-Yyk) to a divider 34.

The subtracter 33 subtracts the luminance signal Yyk from the white clip level WC and supplies a result of this subtraction (WC−Yyk) to the divider 34.

The divider 34 divides the subtraction result (WC−Yyk) by the subtraction result (DMAX−Yyk) to calculate a compression ratio KA as shown in following Equation (6) and supplies it to a compression ratio restriction circuit 38.

$$KA=(WC-Yyk)/(DMAX-Yyk) \quad (6)$$

If the compression ratio KA is larger than "1", the compression ratio restriction circuit 38 restricts the compression ratio KA to "1" and supplies it as a saturation compression ratio KC to the multipliers 36r, 36g and 36b. On the other hand, if the compression ratio KA is not larger than "1", the compression ratio restriction circuit 38 supplies the compression ratio KA calculated by the divider 34 to the multipliers 36r, 36g and 36b as the saturation compression ratio KC.

The subtracter 35r subtracts the luminance signal Yyk from the color signal Ryk and supplies a result of this subtraction to the multiplier 36r. Similarly, the subtracter 35g subtracts the luminance signal Yyk from the color signal Gyk and supplies a result of this subtraction to the multiplier 36g and the subtracter 35b subtracts the luminance signal Yyk from the color signal Byk, and supplies a result of this subtraction to the multiplier 36b.

The multiplier 36r multiplies the subtraction result obtained through the subtracter 35r by the saturation compression ratio KC and supplies a result of this multiplication to the adder 37r. The adder 37r adds the luminance signal Yyk to the multiplication result received from the multiplier 36r to generate a color signal Rcj and supplies it to a clip section 41r.

Similarly, the multipliers 36g and 36b multiply the subtractions results obtained through the subtracters 35g and 35b by the saturation compression ratio KC and supply multiplication results to the adders 37g and 37b, respectively. The adders 37g and 37b add the luminance signal Yyk to the multiplication results received from the multipliers 36g and 36b to generate color signals Gcj and Bcj and supply them to clip sections 41g and 41b, respectively.

The clip sections 41r, 41g, and 41b are respectively supplied with the white clip level WC. These clip sections 41r, 41g, and 41b perform any clip processing on the three primary-color signals Rcj, Gcj, and Bcj received from the adders 37r, 37g, and 37b to generate clip-processed signals and output them as three primary-color signals Rout, Gout, and Bout, respectively.

In other words, the three primary-color signals Rcj, Gcj, and Bcj obtained through performing level conversion on the three primary-color signals Ryk, Gyk, and Byk at the saturation conversion section 30 indicate results of computations by following Equations (7) through (9).

$$Rcj=Yyk+((WC-Yyk)/(DMAX-Yyk))(Ryk-Yyk) \quad (7)$$

$$Gcj=Yyk+((WC-Yyk)/(DMAX-Yyk))(Gyk-Yyk) \quad (8)$$

$$Bcj=Yyk+((WC-Yyk)/(DMAX-Yyk))(Byk-Yyk) \quad (9)$$

By thus performing level compression at the luminance conversion section 20 and performing level conversion at the saturation conversion section 30, as shown in FIG. 5A, if then a brightness becomes higher than a level La, a luminance signal, not shown, generated by using the three primary-color signals Rin, Gin, and Bin reaches a Knee point level LP or higher, so that level compression is performed on the three primary-color signals Rin, Gin, and Bin with a hue thereof being kept constant, to generate the three primary-color signals Ryk, Gyk, and Byk. Then, if any one of the three primary-color signals Ryk, Gyk, and Byk reaches the white clip level WC, any level conversion is performed on saturation components of these signals using the saturation compression ratio KC, thereby adjusting other primary-color signals so that the hue may be constant to generate the three primary-color signals Rout, Gout, and Bout.

Thus, keeping the hue constant allows, in a case where, for example, a luminance level when imaging a person is high, the image of this person to be prevented from being displayed yellowish as if the person is unhealthy. Further, increasing the saturation compression ratio KC enables a gradation of a bright area to be made more visible.

SUMMARY OF THE INVENTION

If, however, the saturation compression ratio KC increases, as compared with a case shown in FIG. 5B where the hue is not kept constant, a saturation is decreased in a bright area where the saturation is adjusted by the saturation conversion section 300. For example, in FIG. 5B, if the brightness level reaches the level Lc, the saturation disappears. On the other hand, in a case shown in FIG. 5A, the saturation disappears when the brightness level reaches a level Lb, which is lower than the level Lc. Accordingly, for example, a background is liable to turn white in the case of imaging a subject against backlight, so that a blue sky appears white in the case of imaging the subject against the backlight if the blue sky is used as a background.

It is preferable if what is being imaged can be recognized in condition not only where the hue can be kept constant but also where a brightness at which the saturation disappears can be set to a high level. Alternatively, it is preferable if the brightness at which the saturation disappears can be set to a higher level even when the hue varies to some extent. Thus, in view of the above, it is desirable to provide a video-signal-processing device that can perform level compression while keeping a hue constant if any one of three primary-color signals is reached or exceeded a Knee point level and, near a white clip, a saturation remains even if it is too bright, an imaging apparatus using the above video-signal-processing device, a method for processing a video signal therefor, and a program product therefor.

According to an embodiment of the invention, there is provided a video-signal-processing device having a luminance conversion section that performs level compression on three input primary-color signals of a color video signal at a same luminance adjustment compression ratio with a hue and a saturation of the color video signal being kept constant, thereby generating three compressed primary-color signals, and a saturation conversion section that performs level conversion on the three compressed primary-color signals by using a saturation compression ratio if a maximum level of at least one of the three compressed primary-color signals exceeds a first level. The saturation conversion section sets the saturation compression ratio by using a minimum level one of the three compressed primary-color signals.

According to another embodiment of the invention, there is provided another video-signal-processing device. This video-signal-processing device has luminance conversion section that performs level compression on three input primary-color signals of a color video signal at the same luminance adjustment compression ratio with a hue and a saturation of the color video signal being kept constant, thereby generating three compressed primary-color signals. The video-signal-processing device also has a saturation conversion section that performs level conversion on the three compressed primary-color signals, if a maximum level of at least one of the three compressed primary-color signals exceeds a first level, to enable the maximum level of the at least one of the three compressed primary-color signals to be correspondent to the first level with the hue and the luminance of the color video signal represented by the three compressed primary-color signals being kept constant. The luminance conversion section performs a set of the luminance adjustment compression ratio by using the minimum level one of the three input primary-color signals and/or a start of the level compression by using the maximum level one of the three input primary-color signals.

In these embodiments, when, for example, a minimum level signal among the compressed three primary-color signals of the color video signal or a signal obtained by mixing the minimum level signal among the compressed three primary-color signals with a luminance signal obtained by using the compressed three primary-color signals has reached a first level, a saturation compression ratio is set so that the color video signal represented by level-converted three compressed primary-color signals may lose its saturation. Further, a luminance adjustment compression ratio is set, for example, on the basis of a level ratio between a minimum level signal among three primary-color signals and a luminance signal generated by using the three primary-color signals or on the basis of a level ratio between a signal obtained by mixing the minimum level signal among three primary-color signals with a luminance signal generated by using the three primary-color signal and the luminance signal. Further, level compression starts based on, for example, a maximum level signal among the three primary-color signals or a signal obtained by mixing the maximum level signal among the three primary-color signals with a luminance signal obtained by using the three primary-color signals.

Thus, according to the above embodiments of the invention, the video-signal-processing device and the like can perform level compression while keeping a hue constant if any one of three primary-color signals is reached or exceeded a Knee point level and, near a white clip, a saturation remains even if it is too bright.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 14A to 14B are diagrams each for showing characteristics of the second embodiment of the video-signal-processing device according to the invention;

FIGS. 17A to 17C are diagrams each for showing characteristics of the third embodiment of the video-signal-processing device according to the invention.

DESCRIPTION OF THE PREFERRED EMBODIMENTS

Figure 6:
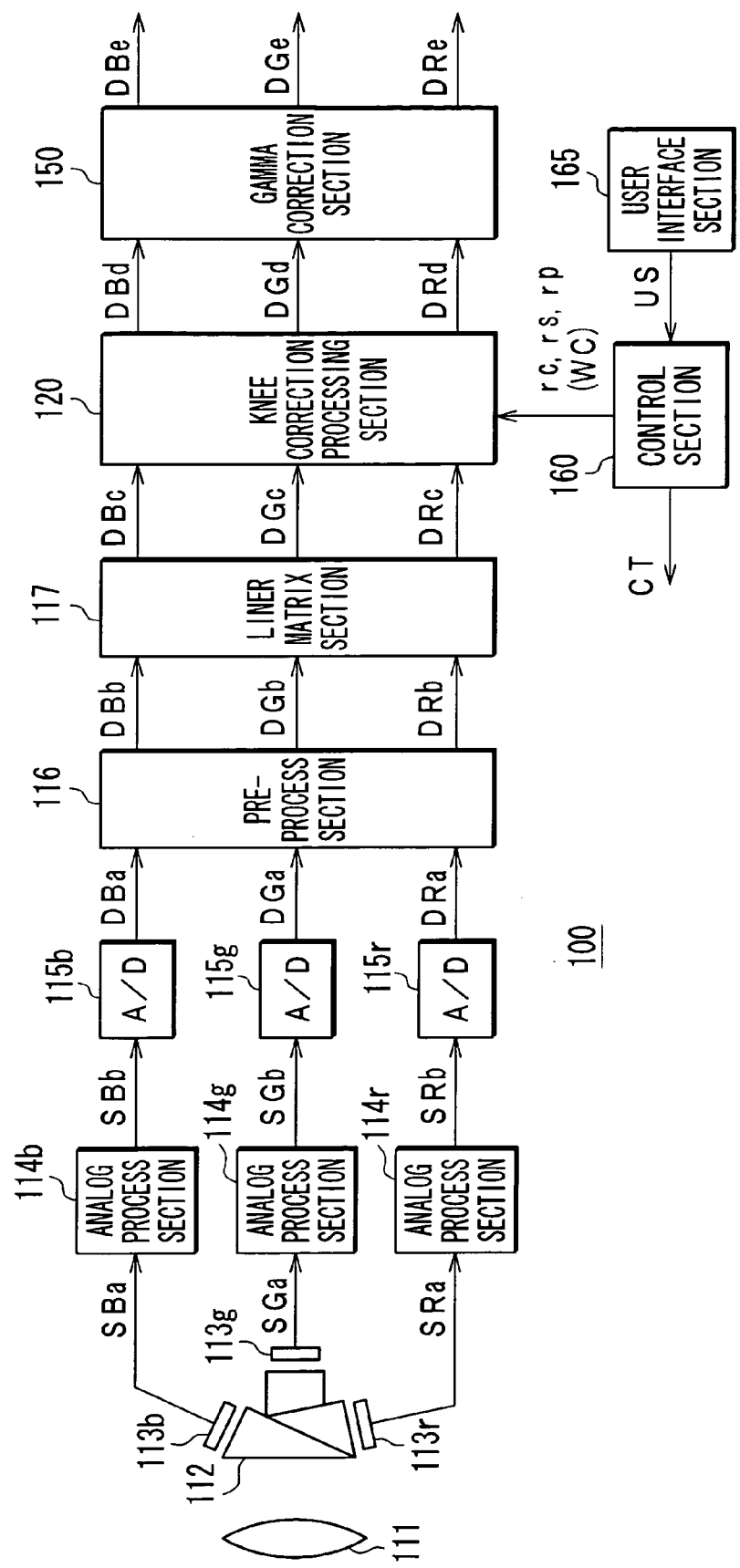
FIG. 6 is a diagram for showing an outlined configuration of an imaging apparatus.

The following will now describe embodiments of the present invention with reference to drawings. FIG. 6 shows an outlined configuration of an imaging apparatus 100. A color separation prism 112 separates light from a subject that has passed through a photographic lens 111 into color components of the three primary-colors, which in turn enter imaging sections 113$r$, 113$g$, and 113$b$, respectively.

The imaging sections 113$r$, 113$g$, and 113$b$ have a structure similar to each other. The imaging section 113$r$ generates an imaging signal SRa based on the red color component thereof and supplies it to an analog process section 114$r$. The imaging section 113$g$ generates an imaging signal SGa based on the green color component thereof and supplies it to an analog process section 114$g$. The imaging section 113$b$ generates an imaging signal SBa based on the blue color component hereof and supplies it to an analog process section 114$b$. Further, to enhance a resolution, the imaging section 113$g$ moves position of pixels by half a pixel horizontally with respect to the imaging sections 113$r$ and 113$b$.

The analog process section 114$r$ receives the imaging signal SRa and performs correlated double sampling processing on the imaging signal SRa for removing noise from it, s well as black-and-white balance control, shading correction, etc on the imaging signal SRa, to generate an imaging signal SRb. The analog process section 114$r$ supplies the imaging signal SRb thus generated to an A/D conversion section 115$r$.

Further, the analog process sections 114g and 114b also perform the same processing as that in the analog process section 114r, to generate imaging signals SGb and SBb and to supply them to A/D conversion sections 115g and 115b, respectively.

The A/D conversion section 115r receives the imaging signal SRb and converts it into a digital three primary-color signal DRa to supply the digital three primary-color signal DRa to a pre-process section 116. Similarly, the A/D conversion sections 115g and 115b receive the imaging signals SGb and SBb and convert them into digital three primary-color signals DGa and DBa, respectively, to supply the digital three primary-color signals DGa and DBa to the pre-process section 116.

The pre-process section 116 receives the digital three primary-color signals DRa, DGa and Dba, and performs image processing, such as deficiency correction on the digital three primary-color signals DRa, DGa, and DBa to generate three primary-color signals DRb, DGb, and DBb and supplies them to a linear matrix section 117.

The linear matrix section 117 performs processing to correct color reproducibility of a picked-up image by using the three primary-color signals DRb, DGb, and DBb to generate three primary-color signals DRc, DGc, and DBc and supplies them to a Knee correction processing section 120.

The Knee correction processing section 120 receives the three primary-color signals DRc, DGc, and Dbc and performs Knee correction processing on them to generate three primary-color signals DRd, DGd, and DBd and supplies them to a gamma correction section 150. The gamma correction section 150 receives the three primary-color signals DRd, DGd and DBd and performs gamma correction on them to generate three primary-color signals DRe, DGe, and DBe and outputs them.

To a control section 160, a user interface section 165 is connected. The user interface section 165 generates an operation control signal US based on a user operation or a command etc. from an externally connected control unit and supplies it to the control section 160. Based on the operation control signal US, the control section 160 generates a control signal CT so that the imaging apparatus 100 may operate in accordance with the user operation or the command from the externally connected control unit and supplies it to various sections. Further, the control section 160 sets mixture ratios rc, rs, and rp based on the operation control signal US so that a brightness at which a saturation disappears can be adjusted in accordance with a user operation or a command from the externally connected control unit and supplies them to the Knee correction processing section 120. The control section 160 stores these mixture ratios rc, rs, and rp and supplies them to the Knee correction processing section 120 when operations start. If any change is later made to the mixture ratios rc, rs, and rp by the operation control signal US, the control section 160 supplies the changed mixture ratios rc, rs, and rp to the Knee correction processing section 120 and stores them. By thus performing the mixture ratios rc, rs, and rp, it is possible to set and change the mixture ratios easily. It is noted that the control section 160 can supply the white clip level WC to the Knee correction processing section 120, or the Knee correction processing section 120 can store the white clip level WC beforehand.

In the present embodiment, the Knee correction processing section 120 has a luminance conversion section for generating three compressed primary-color signals by performing level compression on three primary-color signals at the same luminance adjustment compression ratio with a hue and a saturation of a color video signal represented by the three primary-color signals being kept constant. The Knee correction processing section 120 also has a saturation conversion section for converting levels of the compressed three primary-color signals if a maximum level of at least one of the compressed three primary-color signals exceeds a first level, that is, the white clip level. This luminance conversion section performs level compression while keeping the hue constant if three primary-color signals reaches or exceeds the Knee point level. Further, the saturation conversion section performs level conversion so that a saturation may remain even if it is too bright. Further, a brightness at which a saturation remain can be adjusted by using any one or some of the mixture ratios rc, rs, and rp.

The following will describe first through third embodiments of the Knee correction processing section as the video-signal-processing device. According to the first embodiment thereof, a saturation remains even if a background of a subject to be imaged is too bright, by setting a saturation compression ratio by using a minimum level one among three compressed primary-color signals when the saturation conversion section converts levels of the three compressed primary-color signals. Further, it enables adjustment of a brightness at which a saturation remains by setting a saturation compression ratio by using a signal obtained by mixing the minimum level one among the three compressed primary-color signals with a luminance signal generated using the three compressed primary-color signals in accordance with a mixture ratio rc. By thus setting the saturation compression ratio by using the minimum level one among the three compressed primary-color signals, the saturation compression ratio is set in accordance with a saturation or a hue.

According to the second embodiment thereof, a saturation remains even if a background of a subject to be imaged is too bright, by setting a luminance adjustment compression ratio by using a minimum level one among input three primary-color signals when the luminance conversion section performs level compression on the input three primary-color signals. Further, it enables adjustment of a brightness at which a saturation remains by setting a luminance adjustment compression ratio by using a signal obtained by mixing the minimum level one among the input three compressed primary-color signals with a luminance signal generated using the input three compressed primary-color signals in accordance with a mixture ratio rs. By thus setting the luminance adjustment compression ratio by using the minimum level one among the input three primary-color signals, the luminance adjustment compression ratio is set in accordance with a saturation or a hue.

According to the third embodiment, a saturation remains even if a background of a subject to be imaged is too bright, by starting level compression based on a maximum level one among input three primary-color signals when the luminance conversion section performs level compression on the three primary-color signals. Further, it enables adjustment of a brightness at which a saturation remains by starting level compression by using a signal obtained by mixing the maximum level one among the input three compressed primary-color signals with a luminance signal generated using the input three primary-color signals in accordance with a mixture ratio rp. By thus starting level compression by using the maximum level one among the input three primary-color signals, level compression starts in accordance with a saturation or a hue. It is to be noted that the third embodiment given below will indicate a case that involves also setting the luminance adjustment compression ratio in accordance with a saturation or a hue.

Figure 7:
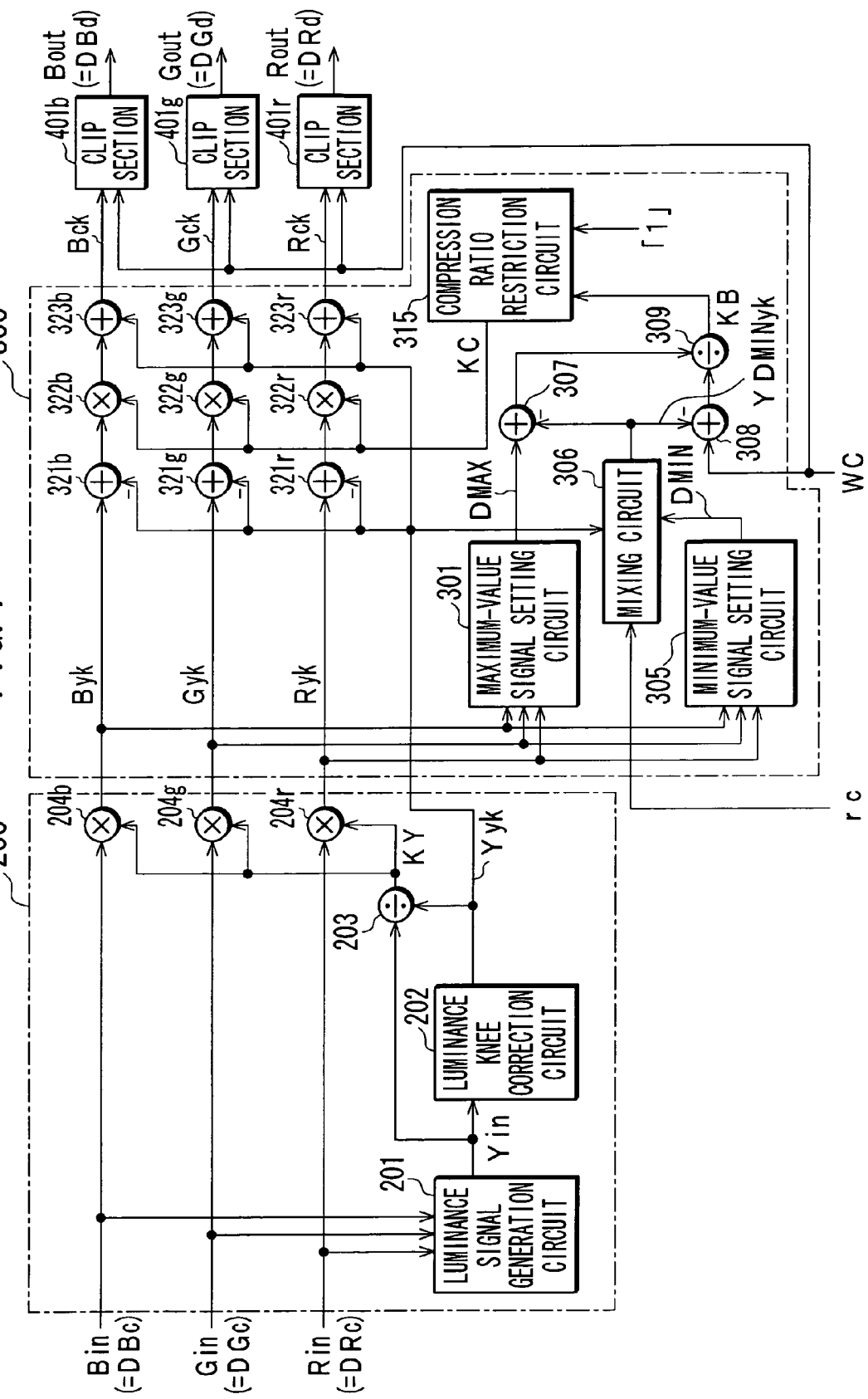
FIG. 7 is a diagram for showing a configuration of a first embodiment of a video-signal-processing device according to the invention.

FIG. 7 shows a configuration of the first embodiment of the Knee correction processing section as the video-signal-processing device, in which a saturation compression ratio is set in accordance with a saturation thereof or a hue thereof. A red color signal Rin (=DRc) is supplied to a luminance signal generation circuit 201 and a multiplier 204r in a luminance conversion section 200. Similarly, a green color signal Gin (=DGc) is supplied to the luminance signal generation circuit 201 and a multiplier 204g in the luminance conversion section 200 and a blue color signal Bin (=DBc) is supplied to the luminance signal generation circuit 201 and a multiplier 204b in the luminance conversion section 200.

The luminance signal generation circuit 201 generates a luminance signal Yin by computing a following Equation (10) provided in ITU-R BT. 601 or a following Equation (11) provided in ITU-R BT. 709, which is an advice of, for example, the International Telegraph Union (ITU) by using the three primary-color signals Rin, Gin, and Bin and supplies it to a luminance Knee correction circuit 202 and a divider 203.

$$Yin = 0.299Rin + 0.587Gin + 0.114Bin \quad (10)$$

$$Yin = 0.2126Rin + 0.7152Gin + 0.0722Bin \quad (11)$$

The luminance Knee correction circuit 202 receives the luminance signal Yin and performs Knee correction on it to generate a luminance signal Yyk. The luminance Knee correction circuit 202 supplies the luminance signal Yyk thus generated to the divider 203, and a mixing circuit 306, subtracters 321r, 321g, and 321b and adders 323r, 323g and 323b in a saturation conversion section 300. It is to be noted that as indicated by following Equation (12), the luminance signal Yyk can be calculated by multiplying a difference between the luminance signal Yin and the Knee point level KP with the above compression ratio KS and adding the Knee point level KP to this product.

$$Yyk = KP + KS*(Yin - KP) \quad (12)$$

The divider 203 divides the luminance signal Yyk by the luminance signal Yin to calculate a luminance adjustment compression ratio KY (=Yyk/Yin) and supplies the obtained luminance adjustment compression ratio KY to the multipliers 204r, 204g, and 204b.

The multiplier 204r multiplies the color signal Rin with the luminance adjustment compression ratio KY to generate a color signal Ryk. Similarly, the multipliers 204g and 204b multiply the color signals Gin and Bin with the luminance adjustment compression ratio KY to generate color signals Gyk and Byk.

That is, the three primary-color signals Ryk, Gyk, and Byk on which the level compression have been performed, are results of computations of following Equations (13) through (15), respectively. Therefore, even after level compression, the hue can be kept constant as related one.

$$Ryk = (Yyk/Yin)*Rin \quad (13)$$

$$Gyk = (Yyk/Yin)*Gin \quad (14)$$

$$Byk = (Yyk/Yin)*Bin \quad (15)$$

The color signal Ryk obtained through level compression is supplied to a maximum-value signal setting circuit 301, a minimum-value signal setting circuit 305, and the subtracter 321r in the saturation conversion section 300. Further, the color signal Gyk is supplied to the maximum-value signal setting circuit 301, the minimum-value signal setting circuit 305, and the subtracter 321g in the saturation conversion section 300 and the color signal Byk is supplied to the maximum-value signal setting circuit 301, the minimum-value signal setting circuit 305, and the subtracter 321b in the saturation conversion section 300.

The maximum-value signal setting circuit 301 receives the three primary-color signals Ryk, Gyk, and Byk and selects a highest level one among them. The maximum-value signal setting circuit 301 then supplies the selected color signal as a maximum value signal DMAX to a subtracter 307.

The minimum-value signal setting circuit 305 receives the three primary-color signals Ryk, Gyk, and Byk and selects a lowest level one among them. The minimum-value signal setting circuit 305 then supplies the selected color signal as a minimum value signal DMIN to the mixing circuit 306.

The mixing circuit 306 generates a mixed signal YDMINyk by mixing the luminance signal Yyk and the minimum value signal DMIN based on a mixture ratio rc that is set in accordance with the operation control signal US and supplies the mixed signal YDMINyk to the subtracters 307 and 308. The mixed signal YDMINyk is produced by calculating, for example, a following Equation (16).

$$YDMINyk = rc*DMIN + (1-rc)*Yyk \quad (16)$$

The subtracter 307 receives the mixed signal YDMINyk and the maximum value signal DMAX and subtracts the mixed signal YDMINyk from the maximum value signal DMAX. The subtracter 307 then supplies a resultant difference (DMAX−YDMINyk) to a divider 309. The subtracter 308 receives the mixed signal YDMINyk and the white clip level WC and subtracts the mixed signal YDMINyk from the white clip level WC. The subtracter 308 then supplies a resultant difference (WC−YDMINyk) to the divider 309.

The divider 309 divides the difference (WC−YDMINyk) by the difference (DMAX−YDMINyk) to calculate a compression ratio KB as indicated by following Equation (17) and supplies it to a compression ratio restriction circuit 315.

$$KB = (WC - YDMINyk)/(DMAX - YDMINyk) \quad (17)$$

The compression ratio restriction circuit 315 receives the compression ratio KB. If the compression ratio KB is larger than "1", the compression ratio restriction circuit 315 restricts the compression ratio KB to "1" and supplies 1 as a saturation compression ratio KC to multipliers 322r, 322g and 322b. On the other hand, if the compression ratio KB is not larger than "1", the compression ratio restriction circuit 315 supplies the compression ratio KB calculated by the divider 309 to the multipliers 322r, 322g and 322b as the saturation compression ratio KC.

The subtracter 321r subtracts the luminance signal Yyk from the color signal Ryk and supplies a difference of this subtraction to the multiplier 322r. Similarly, the subtracter 321g subtracts the luminance signal Yyk from the color signal Gyk and supplies a difference of this subtraction to the multiplier 322g and the subtracter 321b subtracts the luminance signal Yyk from the color signal Byk and supplies a difference of this subtraction to the multiplier 322b.

The multiplier 322r multiplies the difference obtained by the subtracter 321r with the saturation compression ratio KC and supplies a product of this multiplication to the adder 323r. The adder 323r adds the luminance signal Yyk to the product received from the multiplier 322r to generate a color signal Rck and supplies it to a clip section 401r.

Similarly, the multipliers 322g and 322b multiply the differences obtained by the subtracters 321g and 321b with the saturation compression ratio KC and supply the products thereof to the adders 323g and 323b, respectively. The adders 323g and 323b add the luminance signal Yyk to the products received from the multipliers 322g and 322b to generate color signals Gck and Bck. The adders 323*g* and 323*b* then supply them to clip sections 401*g* and 401*b*, respectively.

That is, the three primary-color signals Rck, Gck, and Bck obtained through performing level conversion on the three primary-color signals Ryk, Gyk, and Byk are equal to results of computations of following Equations (18) through (20), respectively.

$$Rck = Yyk + ((WC - YDMINyk)/(DMAX - YDMINyk)) \times (Ryk - Yyk) \quad (18)$$

$$Gck = Yyk + ((WC - YDMINyk)/(DMAX - YDMINyk)) \times (Gyk - Yyk) \quad (19)$$

$$Bck = Yyk + ((WC - YDMINyk)/(DMAX - YDMINyk)) \times (Byk - Yyk) \quad (20)$$

The clip sections 401*r*, 401*g*, and 401*b* are supplied with the white clip level WC. These clip sections 401*r*, 401*g*, and 401*b* perform clip processing on the three primary-color signals Rck, Gck, and Bck received from the adders 323*r*, 323*g*, and 323*b* and output three post-clip processing primary-color signals Rout (=DRd), Gout (=DGd), and Bout (=Dbd), respectively.

Figure 8A:
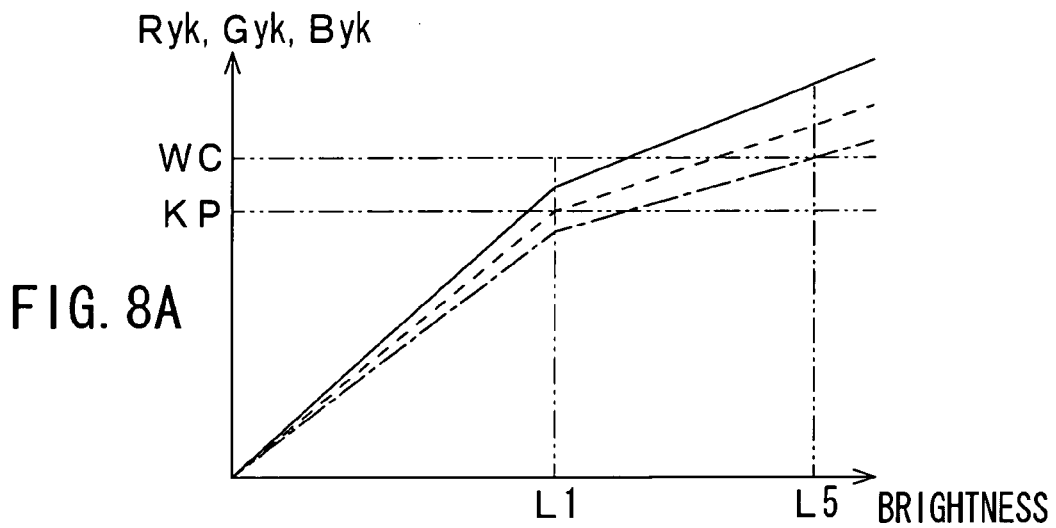
FIGS. 8A to 8C are diagrams each for showing characteristics of the first embodiment of the video-signal-processing device according to the invention.
Figure 8B:
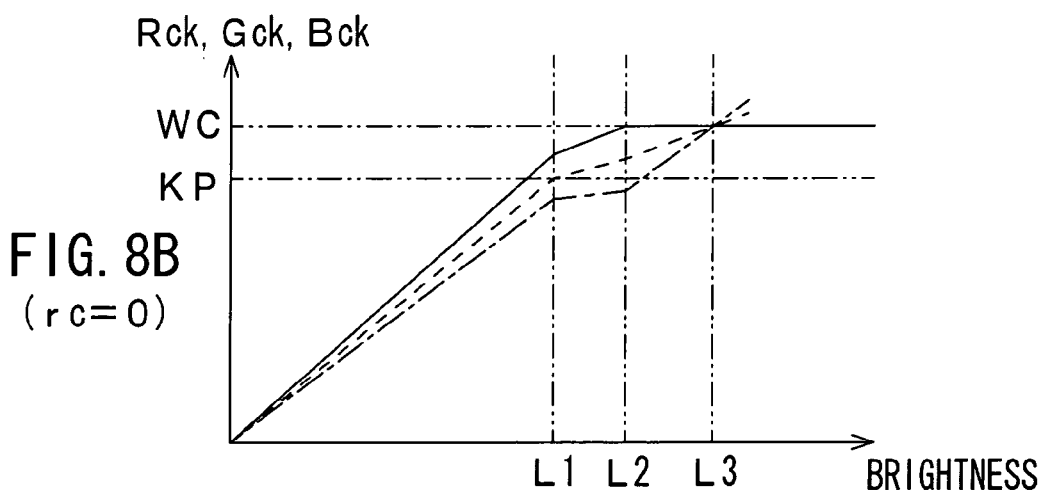
Figure 8C:
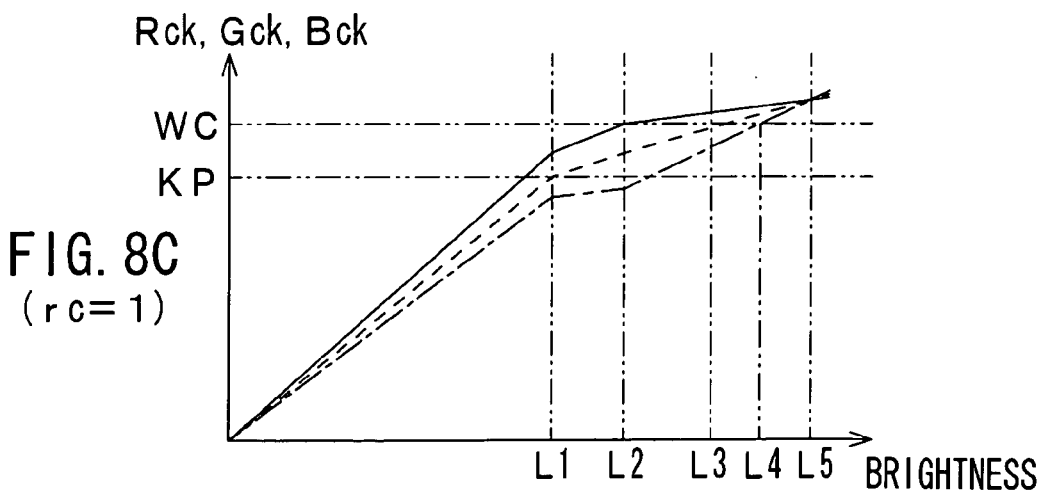

The following will describe characteristics of the first embodiment with reference to FIGS. 8A to 8C. It is to be noted that in FIGS. 8A to 8C, FIGS. 13A and 13B, and 16A to 16C, description will be made assuming that the highest level signal is a red signal (solid line), the second highest one is a green signal (dotted line), and the lowest level one is a blue signal (dash-and-dot line).

FIG. 8A shows the three primary-color signals Ryk, Gyk, and Byk obtained by performing level compression at the luminance conversion section 200. If the brightness is at level L1 or higher, the luminance signal Yin is more than the Knee point level KP and the luminance Knee correction circuit 202 performs compression processing on the luminance signal Yin. In this case, the luminance signal Yyk output from the luminance Knee correction circuit 202 has lower level than that of the luminance signal Yin. Therefore, the luminance adjustment compression ratio KY output from the divider 203 is less than "1" and is equal to a value that corresponds to the above compression ratio KS of the luminance Knee correction circuit 202. Therefore, by multiplying the three primary-color signals Rin, Gin, and Bin by the luminance adjustment compression ratio KY, level compression is performed with a hue being kept constant, thereby enabling the three primary-color signals Ryk, Gyk, and Byk to be obtained.

If all of the three primary-color signals Ryk, Gyk, and Byk are not larger than the white clip level WC, the maximum value signal DMAX is smaller than the white clip level WC, so that the compression ratio KB is "1" or larger. Therefore, the compression ratio restriction circuit 315 sets the saturation compression ratio KC to "1", so that no level conversion is performed in the saturation conversion section 300.

Then, if any one of the three compressed primary-color signals Ryk, Gyk, and Byk exceeds the white clip level WC, the compression ratio KB is smaller than "1" so that any level conversion is performed therein.

FIG. 8B shows the three primary-color signals Rck, Gck, and Bck when the mixture ratio rc is set to "0". In this case, the color signal Ryk has a highest level and so is set as the maximum value signal DMAX. Further, the color signal Byk has a lowest level and so is set as the minimum value signal DMIN. If the mixture ratio rc is set to "0", the mixed signal YDMINyk is equal to the luminance signal Yyk. That is, the Equations (18), (19), and (20) are equal to the Equations (7), (8), and (9), respectively, in relation to related art, thereby providing the same operations as those of related art. Therefore, at brightness level L2 or higher where the color signal Ryk takes on the white clip level WC, level conversion is performed.

Since the maximum value signal DMAX is equal to the color signal Ryk, a relationship of Rck=WC is established in the Equation (18), so that the color signal Rck is kept constant at the white clip level WC. Further, the color signals Gck and Bck undergo level conversion so that a hue may be kept constant. For example, if the brightness is level L3, the three primary-color signals Rck, Gck, and Bck take on the white clip level WC.

Since the clip sections 401*r*, 401*g*, and 401*b* clip the three primary-color signals Rck, Gck, and Bck, respectively, to the white clip level WC, if the mixture ratio rc is set to "0", an image based on the three primary-color signals Rout, Gout, and Bout loses a saturation when the brightness reaches level L3 or higher.

FIG. 8C shows the three primary-color signals Rck, Gck, and Bck when the mixture ratio rc is set to "1". In this case, the color signal Ryk has a highest level and so is set as the maximum value signal DMAX. Further, the color signal Byk has a lowest level and so is set as the minimum value signal DMIN. If the mixture ratio rc is set to "1", the mixed signal YDMINyk is equal to the luminance signal Byk.

In this case, if the brightness reaches level L5 where the color signal Byk takes on the white clip level WC as shown in FIG. 8A, the mixed signal YDMINyk takes on the white clip level WC. Therefore, as may be clear from the Equations (18), (19), and (20), the three primary-color signals Rck, Gck, and Bck become equal to the luminance signal Yyk at the time when the color signal Byk has the white clip level WC. Further, at the brightness level L2 where the color signal Ryk takes on the white clip level WC, the maximum value signal DMAX takes on the white clip level WC. Therefore, as may be clear from the Equations (18), (19), and (20), the three primary-color signals Rck, Gck, and Bck in this case become equal to the three primary-color signals Ryk, Gyk, and Byk.

Accordingly, in a case where the mixture ratio rc is set to "1", at brightness level L4 where the color signal Bck takes on the white clip level WC as shown in FIG. 8C, the three primary-color signals Rck, Gck, and Bck are clipped at the white clip level WC, so that the image based on the three primary-color signals Rout, Gout, and Bout loses a saturation.

By thus adjusting the mixture ratio rc of the luminance signal Yin and the minimum value signal DMIN, it is possible to vary a brightness at which the levels of the three primary-color signals Rck, Gck, and Bck agree within a range between the level L3 and the level L5. Therefore, it is possible to adjust the brightness at which a saturation disappears within a range between the levels L3 and L4. It is to be noted that if the mixture ratio rc is set to a value that is larger than "0", if any one of the three primary-color signals Ryk, Gyk, and Byk exceeds the white clip level WC, clip processing is performed on only the color signal in excess of the white clip level WC, so that the hue changes moderately.

Figure 9:
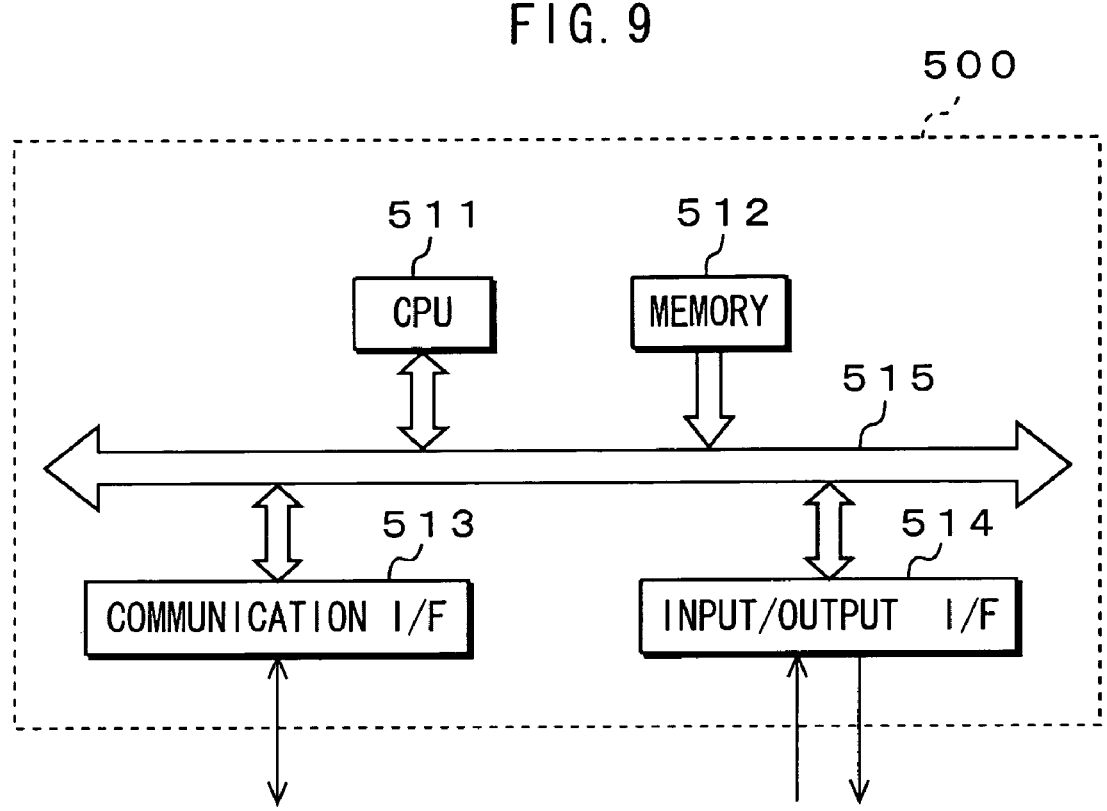
FIG. 9 is a diagram for illustrating a configuration of a system for processing a Knee correction in a computer or a network by executing software therein.

It to be noted that the above-described Knee correction processing can be also carried out in a system 500 shown in FIG. 9, which can be used in a computer or a network, by executing software therein. In this case, for example, a program is stored in a memory 512 or a recording medium such as CD, DVD, HDD beforehand, so that this stored program can be read on the memory 512. Alternatively, a program is distributed via a network and the system 500 in which a communication interface 513 is connected with the network downloads the program in the memory 512. A central processing unit (CPU) then reads the program out of the memory 512 and executes it. The CPU 511, the memory 512, the communication interface 513, and an input/output interface 514 are connected with each other via a bus 515.

Figure 10:
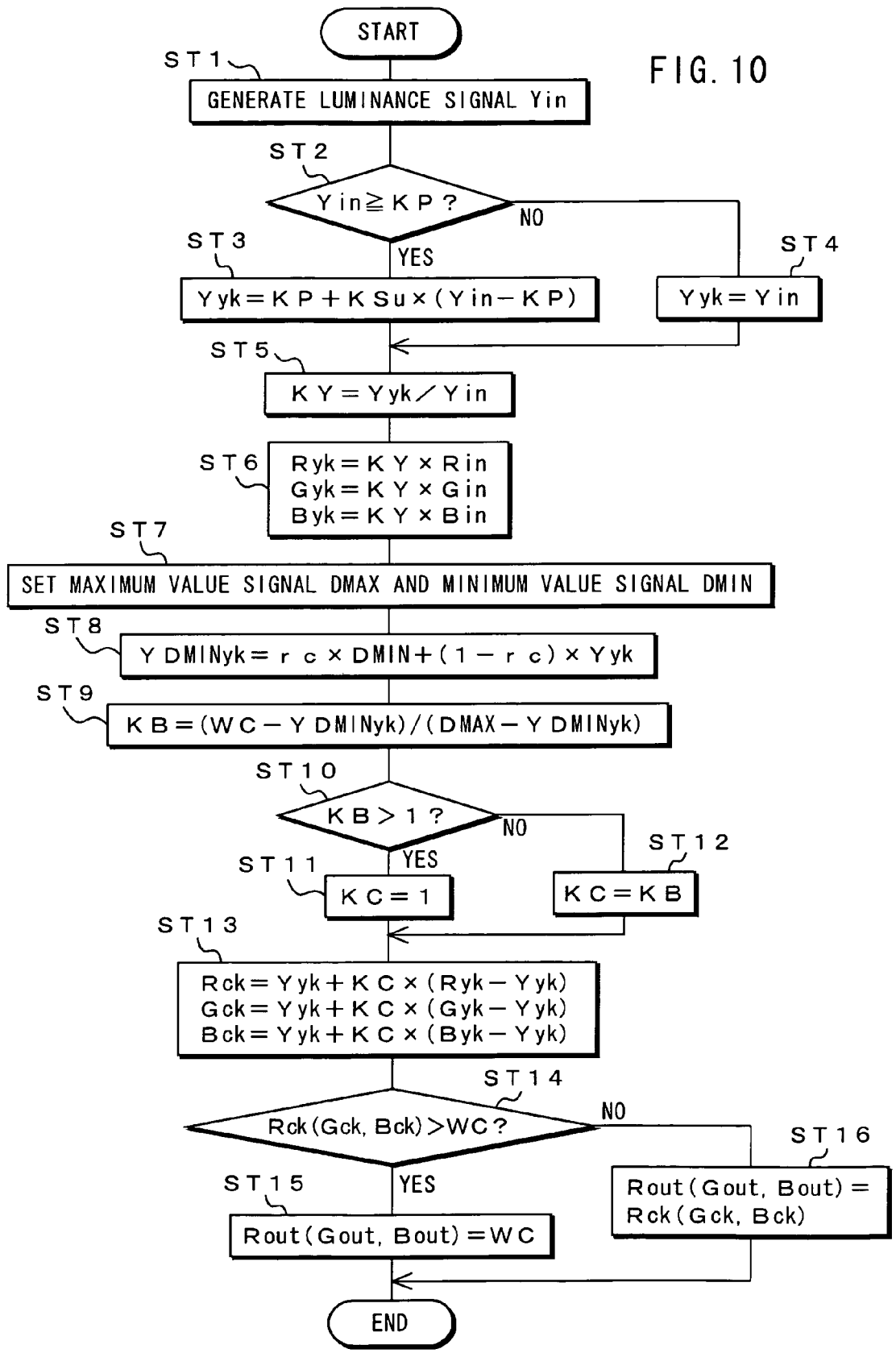
FIG. 10 is a flowchart of operation process of the first embodiment of the Knee correction processing according to the invention by executing the software in the system as shown in FIG. 9.

FIG. 10 is a flowchart of the operation process for such the Knee correction processing as the first embodiment thereof by executing the software in the system 500 as shown in FIG. 9. At step ST1, the CPU 511 generates a luminance signal. In this generation of the luminance signal, the computations indicated by the above Equations (10) and (11) by using the three primary-color signals Rin, Gin, and Bin that are supplied through the input/output interface 514 are performed, thereby generating the luminance signal Yin.

At step ST2, the CPU 511 determines whether a luminance signal Yin is at the Knee point level KP or higher. If it is at the Knee point level KP or higher, the process goes to step ST3 and, otherwise, the process goes to step ST4.

AT step ST3, the CPU 511 performs computations of the above Equation (12) to calculate the luminance signal Yyk and the process goes to step ST5. Further, at step ST4, the CPU 511 sets the luminance signal Yin as the luminance signal Yyk and the process goes to step ST5.

At step ST5, the CPU 511 divides the luminance signal Yyk by the luminance signal Yin to calculate a luminance adjustment compression ratio KY.

At step ST6, the CPU 511 multiplies the three primary-color signals Rin, Gin, and Bin, respectively, by the luminance adjustment compression ratio KY, to generate three post-level compression primary-color signals Ryk, Gyk, and Byk. Process by these steps ST1 through ST6 generates three primary-color signals each having a level compressed at the luminance adjustment compression ratio.

At step ST7, the CPU 511 sets a maximum value signal DMAX and a minimum value signal DMIN based on the three primary-color signals Ryk, Gyk, and Byk and the process goes to step ST8.

At the step ST8, the CPU 511 performs computations of the above Equation (16) to generate a mixed signal YDMINyk.

At step ST9, the CPU 511 performs computations of the above Equation (17) to calculate a compression ratio KB.

At step ST10, the CPU 511 determines whether the compression ratio KB is larger than "1". If it is decided to be larger than "1", the process goes to step ST11 and, otherwise, the process goes to step ST12.

At the step ST11, the CPU 511 sets a saturation compression ratio KC to "1" and the process goes to step ST13. Further, at the step ST12, the CPU 511 sets the compression ratio KB to the saturation compression ratio KC and the process goes to the step ST13.

At the step ST13, the CPU 511 performs a level conversion through computations of the above Equations (18) through (20) to generate the three primary-color signals Rck, Gck, and Bck. It is to be noted that at the step ST13, the Equations (18) through (20) are indicated using the saturation compression ratio. The process by these steps ST7 through ST13 can perform level conversion on the three level-compressed primary-color signals by using the saturation compression ratio.

At step ST14, the CPU 511 determines whether the color signal Rck is in excess of the white clip level WC. If the color signal Rck is in excess of the white clip level WC, the process goes to step ST15 where the white clip level WC is set to a color signal Rout. Otherwise, the process goes to step ST16 where the color signal Rck is set to one signal Rout of the three primary-color signals. Further, the CPU 511 also performs steps ST14 through ST16 on color signals Gck and Bck to generate color signals Gout, Bout.

The color signals Rout, Gout, Bout are then output via the input/output interface 54.

In such a manner, in conversion of levels of the three primary-color signals Ryk, Gyk, and Byk at the saturation conversion section 300, a lowest level one among the three primary-color signals Ryk, Gyk, and Byk is selected as the minimum value signal DMIN, and the saturation compression ratio KC is then set so that a saturation of a color video signal represented by the three post-level conversion primary-color signals Rck, Gck, and Bck may disappear when this minimum value signal DMIN takes on a first level, for example, the white clip level WC. In other words, the saturation compression ratio KC is set on the basis of a saturation or a hue, so that by performing level conversion by using this saturation compression ratio KC, a saturation can remain even if a background of a subject to be imaged is too bright. Further, the minimum value signal DMIN is mixed with the luminance signal Yyk and the saturation compression ratio KC is set so that a saturation of a color video signal represented by the three post-level conversion primary-color signals Rck, Gck, and Bck may disappear when the mixed signal YDMINyk to which the luminance signal Yyk is mixed takes on the first level, thereby setting a mixture ratio rc between the minimum value signal DMIN and the luminance signal Yyk at the control section 160 based on the operation control signal US from the user interface section 165. That is, the control section 160 and the user interface section 165 perform the mixture ratio setting. Therefore, for example, if a user changes the mixture ratio rc, as shown in FIG. 8C, the brightness at which the saturation disappears can be adjusted within a range between level L3 and level L4.

In the above first embodiment, in a case where the mixture ratio rc is set to a value larger than "0" when any one of the three primary-color signals Ryk, Gyk, and Byk exceeds the white clip level WC, any clip processing is performed on this color signal in excess of the white clip level WC, so that the hue changes moderately. Accordingly, a second embodiment of the Knee correction processing section as the video-signal-processing device, which keeps a hue constant, will be described below.

According to the second embodiment of the Knee correction processing section, when a luminance conversion section performs level compression on the three primary-color signals, a luminance adjustment compression ratio is set on the basis of a saturation and a hue so that the saturation may remain with the hue being kept constant even if a background of a subject to be imaged is too bright. Further, a mixture ratio rs is used to thereby enable adjustment of a brightness at which the saturation remains.

Figure 11:
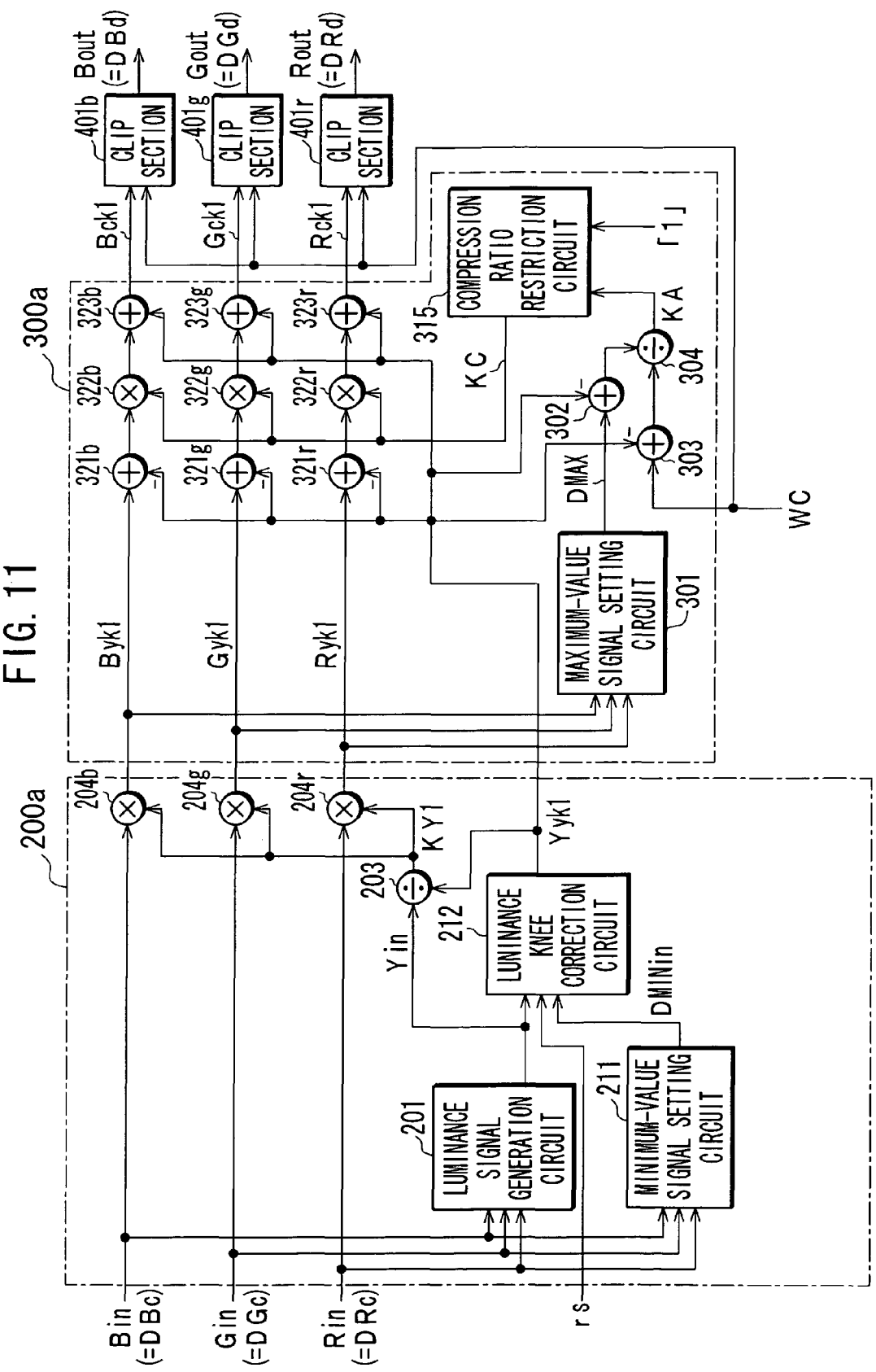
FIG. 11 is a diagram for showing a configuration of a second embodiment of a video-signal-processing device according to the invention.

FIG. 11 shows a configuration of the second embodiment of the Knee correction processing section as the video-signal-processing device. In FIG. 11, elements that correspond to those in FIG. 7 are indicated by the same symbols and numerals, detailed description of which will be omitted.

A minimum-value signal setting circuit 211 in a luminance conversion section 200a receives three primary-color signals Rin, Gin, and Bin and determines a lowest level one among them. The minimum-value signal setting circuit 211 then supplies this determined color signal as a minimum value signal DMINin to a luminance Knee correction circuit 212.

The luminance Knee correction circuit 212 receives a luminance signal Yin from the luminance signal generation circuit 201 and the minimum value signal DMINin from the minimum-value signal setting circuit 211 to use them, thereby setting a compression ratio KSu with a post-luminance Knee correction compression ratio KS varying in accordance with a saturation and a hue. Further, it performs luminance Knee correction by using the compression ratio KSu, to generate a luminance signal Yyk1.

Figure 12:
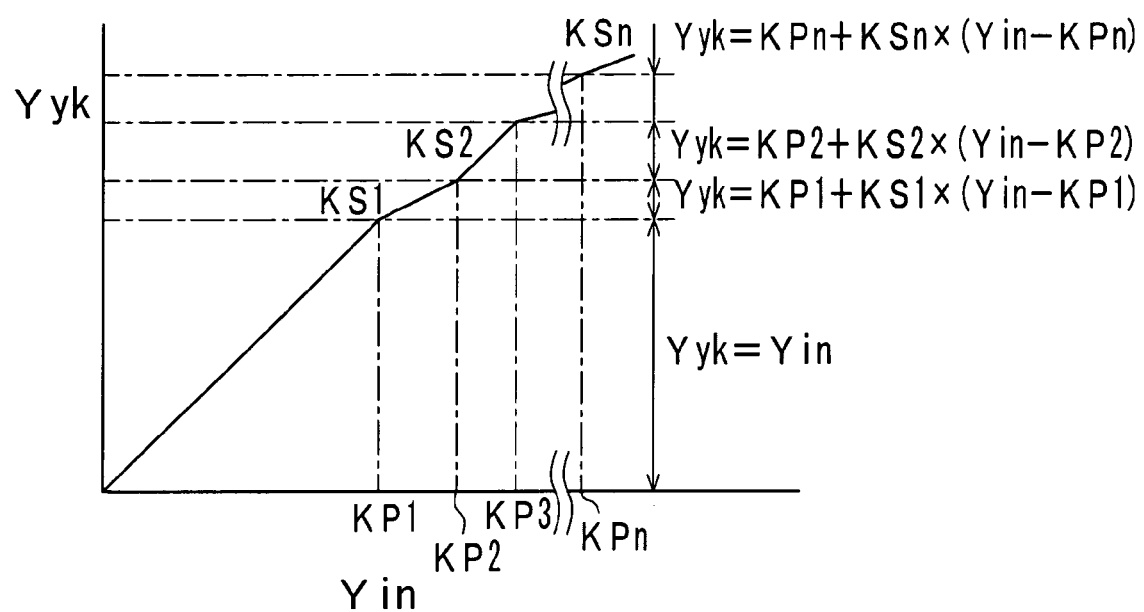
FIG. 12 is a diagram for showing typical Knee correction operations.

Typical Knee correction operations will be described as follows. For example, in a case where Knee correction is to be performed as shown in FIG. 12, if the luminance signal Yin is smaller than a Knee point level KP1, the luminance signal Yin is not compressed to provide a luminance signal Yyk as it is. If the luminance signal Yin is not less than the Knee point level KP1 and less than a Knee point level KP2, a difference between the luminance signal Yin and the Knee point level KP1 is multiplied by a compression ratio KS1, to whose product the Knee point level KP1 is added to provide the luminance signal Yyk. If the luminance signal Yin is not less than the Knee point level KP2 and less than a Knee point level KP3, a difference between the luminance signal Yin and the Knee point level KP2 is multiplied by the compression ratio KS2, to whose product the Knee point level KP2 is added to provide the luminance signal Yyk. Similarly, each time the luminance signal Yin reaches a Knee point level, the corresponding compression ratio is used to generate the luminance signal Yyk, so that if the luminance signal Yin is not less than a Knee point level KPn, a difference between the luminance signal Yin and the Knee point level KPn may be multiplied by the compression ratio KSn, to whose product the Knee point level KPn may be added to provide the luminance signal Yyk.

Figure 13:
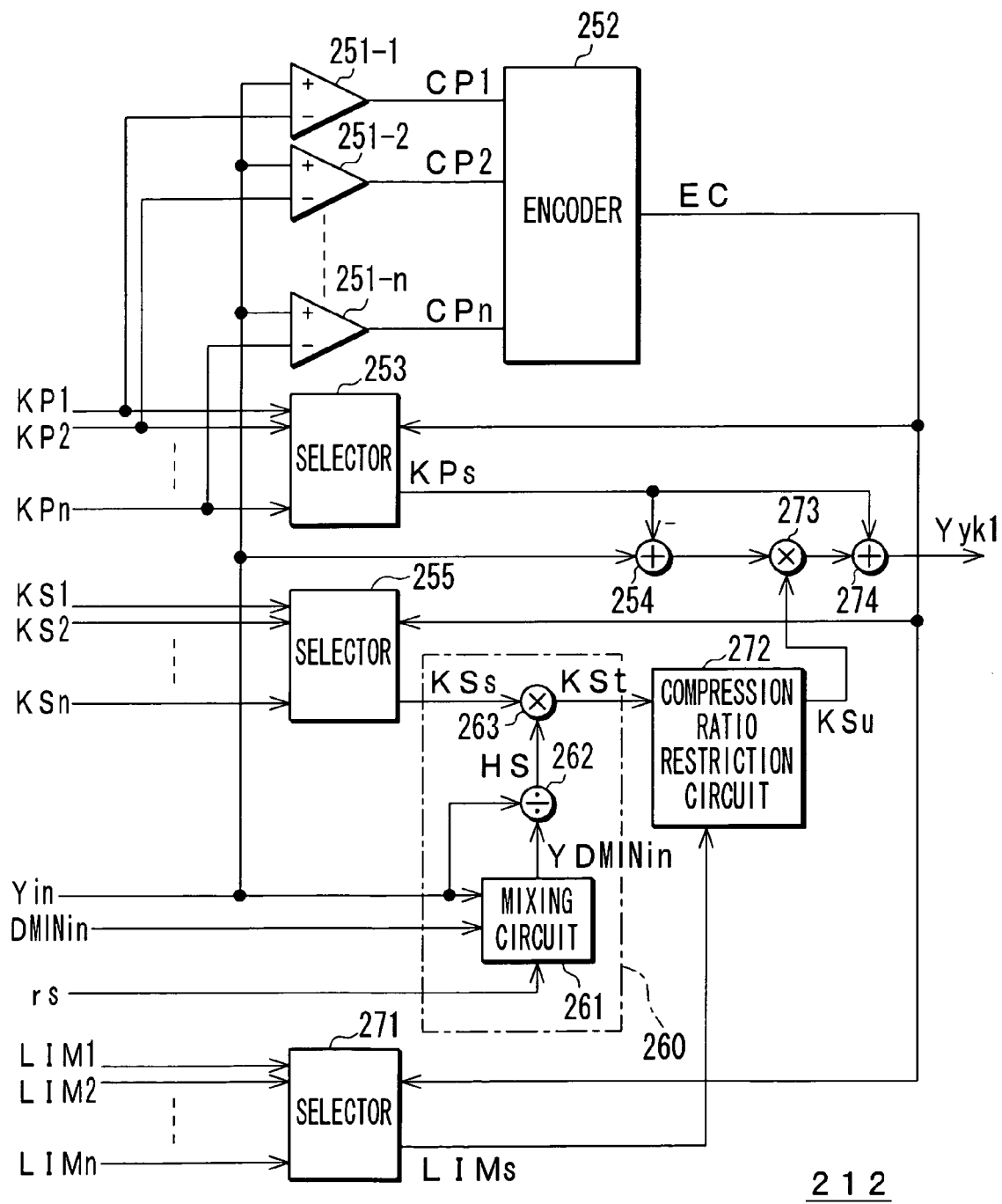
FIG. 13 is a diagram for showing a configuration of a luminance Knee correction circuit.

FIG. 13 shows the luminance Knee correction circuit 212. The luminance signal Yin is supplied to comparators 251-1 through 251-n and a subtracter 254 in the luminance Knee correction circuit 212 and a mixing circuit 261 and a divider 262 in a compression ratio adjustment circuit 260. The comparator 251-1 is supplied with the Knee point level KP1 and so compares the luminance signal Yin with the Knee point level KP1 to generate a comparison result CP1. The comparator 251-1 supplies the comparison result CP1 to an encoder 252.

Similarly, the comparators 251-2 through 251-n are respectively supplied with the knee point levels KP2 through KPn and so compares the luminance signal Yin with each of the Knee point levels KP2 through KPn to generate comparison results. The comparators 251-2 through 251-n respectively supply the comparison results CP2 through CPn to the encoder 252. The encoder 252 receives the comparison results CP1 through CPn and, based on them, generates an encode signal EC that indicates which one of the Knee point levels the luminance signal Yin has reached. The encoder 252 supplies the encode signal EC thus generated to selectors 253, 255, and 271.

The selector 253 is supplied with the above-described Knee point levels KP1 through KPn. Based on the encode signal EC, the selector 253 selects among the Knee point levels KP1 through Kpn a Knee point level that is equal to the luminance signal Yin or selects a maximum Knee point level among the Knee point levels which the luminance signal Yin exceeds. The selector 253 supplies the selected Knee point level as a Knee point level KPs to a subtracter 254 and an adder 274.

The subtracter 254 receives the Knee point level KPs and subtracts it from the luminance signal Yin to obtain a difference between them. The subtracter 254 then supplies the difference to a multiplier 273.

The selector 255 is supplied with a compression ratio KS1 at the time when the luminance signal Yin has reached the Knee point level KP1 or higher, a compression ratio KS2 at the time when the luminance signal Yin has reached the Knee point level KP2 or higher, . . . , and a compression ratio KSn at the time when the luminance signal Yin has reached the Knee point level KPn or higher.

The selector 255 also receives the encode signal EC and selects a compression ratio that corresponds to the Knee point level KPs selected by the selector 253 based on the encode signal EC and supplies it as a compression ratio KSs to a multiplier 263 in the compression ratio adjustment circuit 260.

The mixture ratio rs and the minimum value signal DMINin supplied from the minimum-value signal setting circuit 211 are supplied to the mixing circuit 261 in the compression ratio adjustment circuit 260.

The mixing circuit 261 mixes the luminance signal Yin and the minimum value signal DMINin at the mixture ratio rs to generate a mixed signal YDMINin. The mixing circuit 261 then supplies it to the divider 262. For example, the mixing circuit 261 generates the mixed signal YDMINin based on following Equation (21) and supplies it to the divider 262.

$$YDMINin = rs*DMINin + (1-rs)*Yin \quad (21)$$

The divider 262 receives the mixed signal YDMINin and divides it by the luminance signal Yin to generate a quotient thereof. The divider 262 then supplies the quotient as a mixture ratio-adjustment coefficient HS (=YDMINin/Yin) to a multiplier 263.

The multiplier 263 receives the mixture ratio-adjustment coefficient HS. The multiplier 263 also receives the compression ratio KSs thus selected from the selector 255. The multiplier 263 multiplies the compression ratio KSs by the mixture ratio-adjustment coefficient HS to adjust the compression ratio KSs and supplies the adjusted compression ratio KSt to a compression ratio restriction circuit 272. That is, a compression ratio KSt is given by following Equation (22).

$$KSt = KSs*((rs*DMINin + (1-rs)*Yin)/Yin) \quad (22)$$

In such a manner, by generating the mixture ratio-adjustment coefficient HS by using the minimum value signal DMINin, the compression ratio KSt provides a compression ratio varied on the basis of a saturation or a hue. Further, in the luminance Knee correction, the mixture ratio rs is used to set a ratio of whether to perform correction based on a level of the luminance signal Yin or based on a saturation or a hue.

The selector 271 receives the encode signal EC as well as a compression ratio lower limit LIM1 that corresponds to the compression ratio KS1, a compression ratio lower limit LIM2 that corresponds to the compression ratio KS2, . . . , and a compression ratio lower limit LIMn that corresponds to the compression ratio KSn. These compression lower limits are used to define lower limits of the compression ratio to prevent a gradation from being impaired if the compression ratio becomes too small. The compression ratio lower limit LIMn is set by, for example, following Equation (23).

$$LIMn = (WC - KPn)/(SAT - KPn) \quad (23)$$

where "SAT" indicates a saturated quantity of an input signal, that is, a level of the luminance signal Yin when an output of an imaging pickup device is saturated.

This equation (23) converts a change in level up to the saturated quantity of signal to a change in level up to the white clip level. Thus, by limiting a compression ratio to the compression ratio lower limit LIM, it is possible to prevent a level at the time of the saturated quantity of signal from becoming smaller than the white clip level WC.

Based on the encode signal EC, the selector 271 selects among the compression ratio lower limits LIMn a compression ratio lower limit that corresponds to the compression ratio KSs selected by the selector 255 and supplies it as a compression ratio lower limit LIMs to the compression ratio restriction circuit 272.

The compression ratio restriction circuit 272 receives the compression ratio KSt from the multiplier 263 and the compression ratio lower limit LIMs from the selector 271. The compression ratio restriction circuit 272 selects which the compression ratio KSt or the compression ratio lower limit LIMs is larger in level, thereby restricting a lower limit of the compression ratio. The compression ratio restriction circuit 272 supplies the selected one as a compression ratio KSu to the multiplier 273.

The multiplier 273 multiplies a difference supplied from the subtracter 254, that is, a difference between the luminance signal Yin and the Knee point level KPs with the compression ratio KSu supplied from the compression ratio restriction circuit 272. The multiplier 273 then supplies a product thereof to the adder 274. The adder 274 adds the Knee point level KPs to the product, to generate a luminance signal Yyk1. Further, the multiplier 273 supplies the generated luminance signal Yyk1 to the divider 203 shown in FIG. 11.

The divider 203 divides the luminance signal Yyk1 by the luminance signal Yin and supplies a quotient thereof as a luminance adjustment compression ratio KY1 to multipliers 204$r$, if 204$g$, and 204$b$. The multiplier 204$r$ multiplies the color signal Rin by the luminance adjustment compression ratio KY1 to generate a color signal Ryk1. Similarly, the multipliers 204$g$ and 204$b$ multiply the color signals Gin and Bin by the luminance adjustment compression ratio KY1 to generate color signals Gyk1 and Byk1.

In this case, the luminance Knee correction circuit 212 performs luminance Knee correction by using the compression ratio KSu varied on the basis of a saturation or a hue to generate the luminance signal Yyk1. This enables the luminance adjustment compression ratio KY1 to vary on the basis of the saturation or the hue.

Then, a saturation conversion section 300$a$ performs a level conversion by using the three primary-color signals Ryk1, Gyk1, and Byk1 as in a manner similar to related art, thereby generating the three primary-color signals Rout, Gout, and Bout.

That is, the generated three primary-color signals Ryk1, Gyk1, and Byk1 are supplied to a maximum-value signal setting circuit 301 and subtracters 321$r$, 321$g$, and 321$b$ in the saturation conversion section 300$a$. The maximum-value signal setting circuit 301 selects a highest level one among the three primary-color signals Ryk1, Gyk1, and Byk1 and supplies the selected color signal as the maximum value signal DMAX to a subtracter 302. The subtracter 302 subtracts the luminance signal Yyk1 from the maximum value signal DMAX and supplies a difference (DMAX−Yyk1) to a divider 304.

A subtracter 303 subtracts the luminance signal Yyk1 from the white clip level WC and supplies a difference (WC−Yyk1) to the divider 304.

The divider 304 divides the difference (WC−Yyk1) by the difference (DMAX−Yyk1) to calculate a compression ratio KA and supplies it to a compression ratio restriction circuit 315.

If the compression ratio KA is larger than "1", the compression ratio restriction circuit 315 restricts the compression ratio KA to "1" and supplies this "1" as a saturation compression ratio KC to multipliers 322$r$, 322$g$, and 322$b$. On the other hand, if the compression ratio KA is not larger than "1", the compression ratio restriction circuit 315 supplies the compression ratio KA calculated by the divider 304 as the saturation compression ratio KC to the multipliers 322$r$, 322$g$, and 322$b$.

The subtracter 321$r$ subtracts the luminance signal Yyk1 from the color signal Ryk and supplies a difference thereof to the multiplier 322$r$. Similarly, the subtracter 321$g$ subtracts the luminance signal Yyk1 from the color signal Gyk and supplies a difference thereof to the multiplier 322$g$ and the subtracter 321$b$ subtracts the luminance signal Yyk1 from the color signal Byk and supplies a difference thereof to the multiplier 322$b$.

The multiplier 322$r$ multiplies the difference obtained through the subtracter 321$r$ by the saturation compression ratio KC and supplies a product thereof to an adder 323$r$. The adder 323$r$ adds the luminance signal Yyk1 to the product supplied from the multiplier 322$r$ to generate a color signal Rck1. The adder 323$r$ supplies the color signal Rck1 to a clip section 401$r$.

Similarly, the multipliers 322$g$ and 322$b$ multiply the differences obtained through the subtracters 321$g$ and 321$b$ respectively by the saturation compression ratio KC and supply the products thereof to adder 323$g$ and 323$b$, respectively. The adders 323$g$ and 323$b$ add the luminance signal Yyk1 to the products supplied from the multipliers 322$g$ and 322$b$, respectively, to generate color signals Gck1 and Bck1. The adders 323$g$ and 323$b$ supply the obtained color signals Gck1 and Bck1 to clip sections 401$g$ and 401$b$, respectively.

The clip sections 401$r$, 401$g$, and 401$b$ are respectively supplied with the white clip level WC. Each of the clip sections 401$r$, 401$g$, and 401$b$ performs any clip processing on any one of the three primary-color signals Rck1, Gck1, and Bck1 supplied from the adders 323$r$, 323$g$, and 323$b$ and outputs any one of the three post-clip processing primary-color signals Rout, Gout, and Bout.

Next, the following will describe characteristics of the second embodiment of the Knee correction processing section as the video-signal-processing device with reference to FIGS. 14A and 14B. It is to be noted that to simplify explanation, in FIGS. 14A and 14B, one Knee point level KP is provided to set the corresponding compression ratio as the above compression ratio KS.

Figure 1:
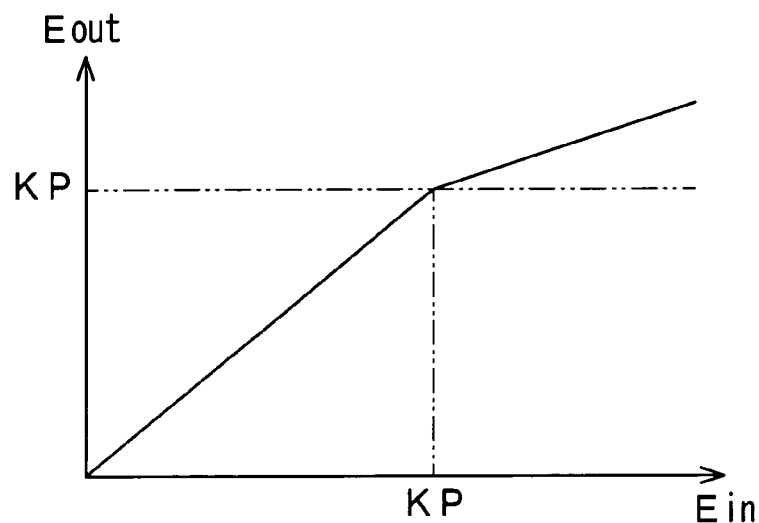
FIG. 1 is a diagram for showing characteristics of Knee correction.
Figure 2:
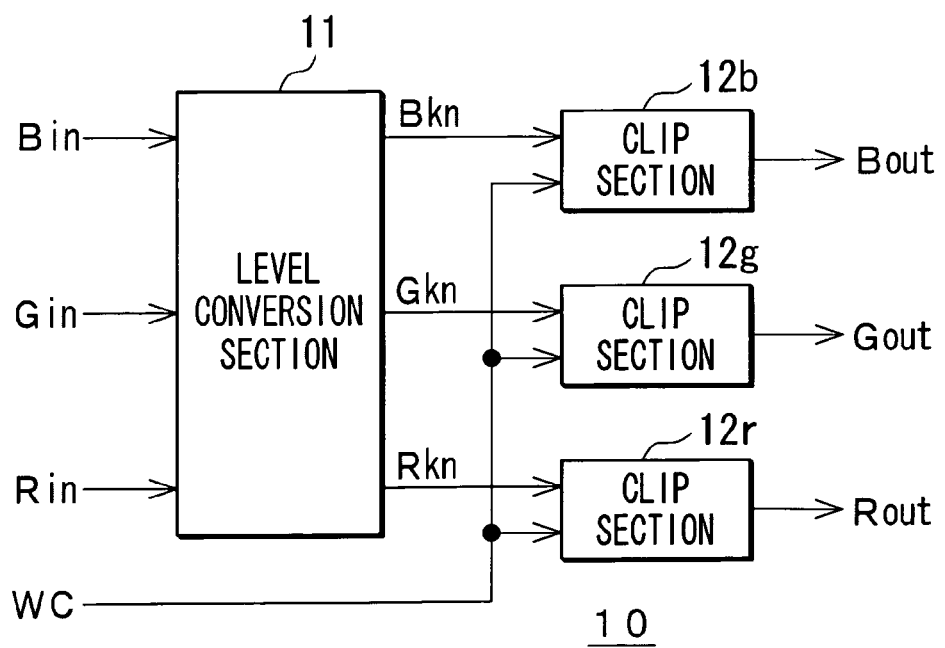
FIG. 2 is an illustration for illustrating a configuration of a Knee correction processing device in accordance with related art.
Figure 3:
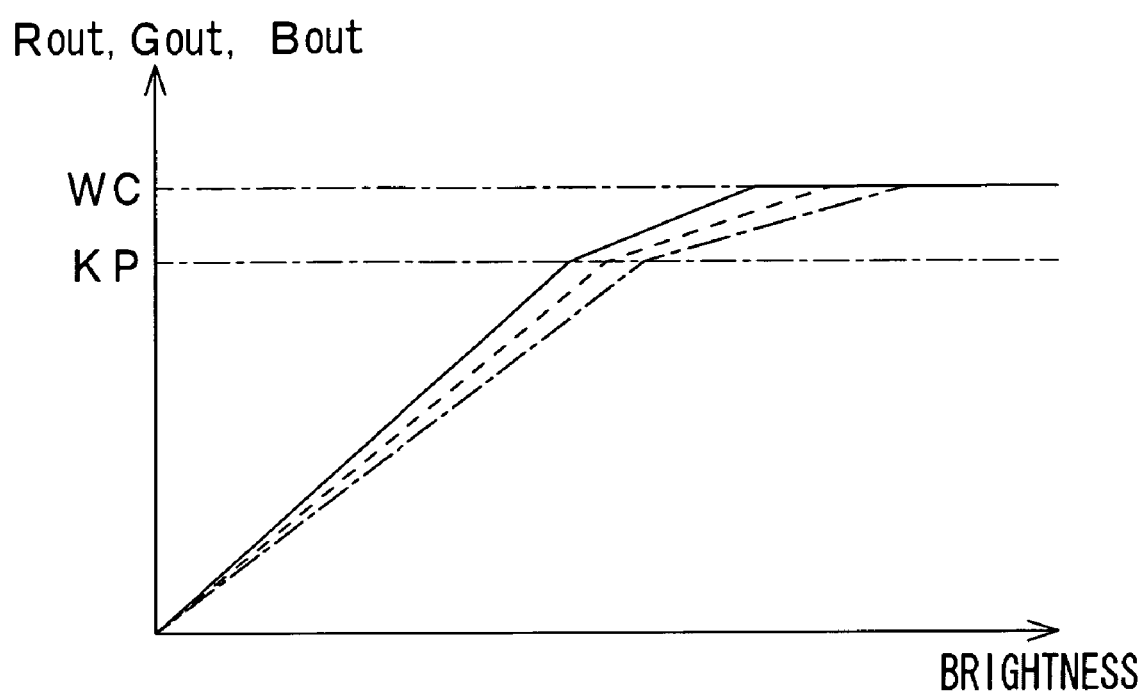
FIG. 3 is a diagram for showing characteristics of the Knee correction processing device in accordance with related art.
Figure 4:
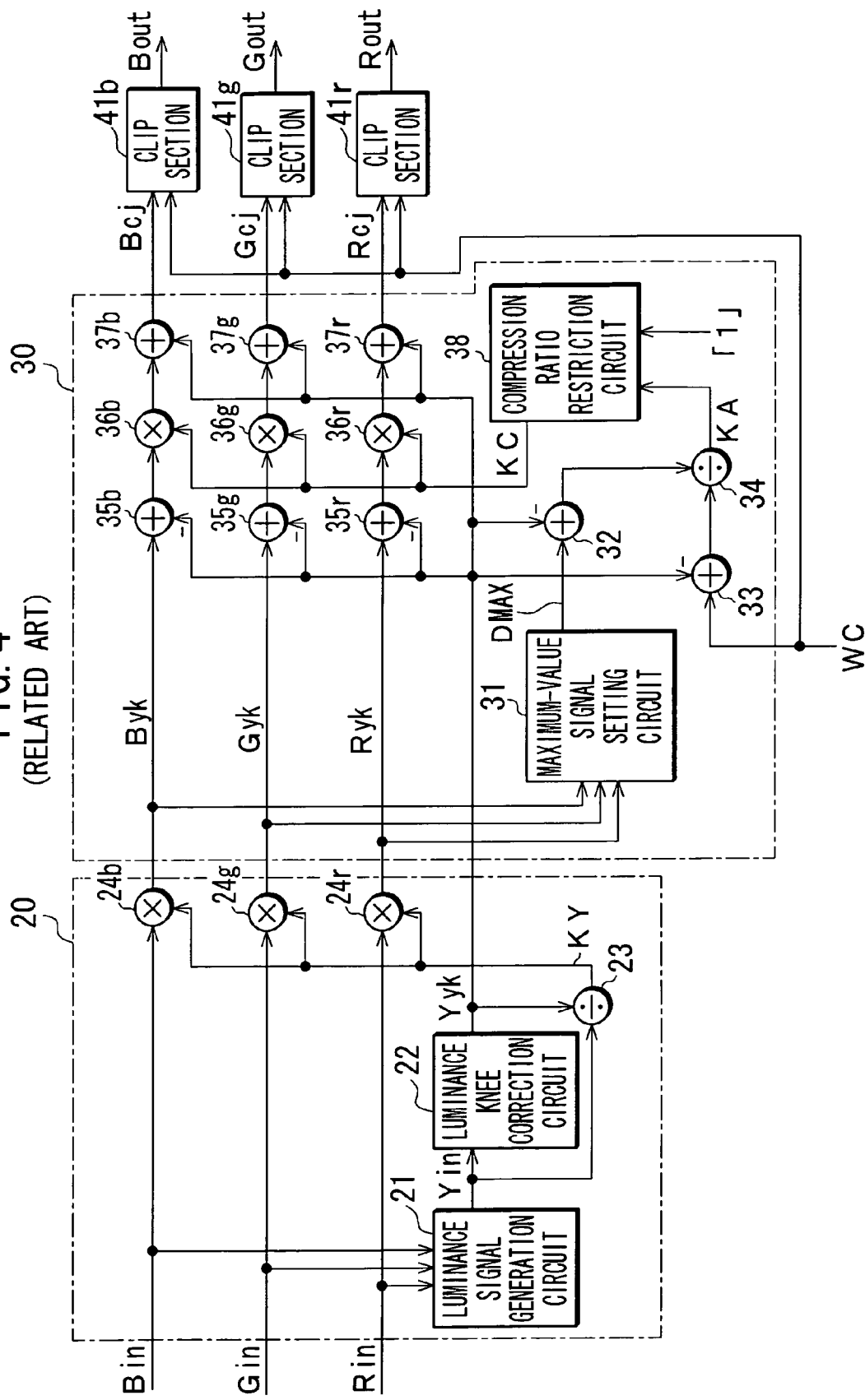
FIG. 4 is a diagram for showing a configuration of a video-signal-processing device in accordance with related art.
Figure 5A:
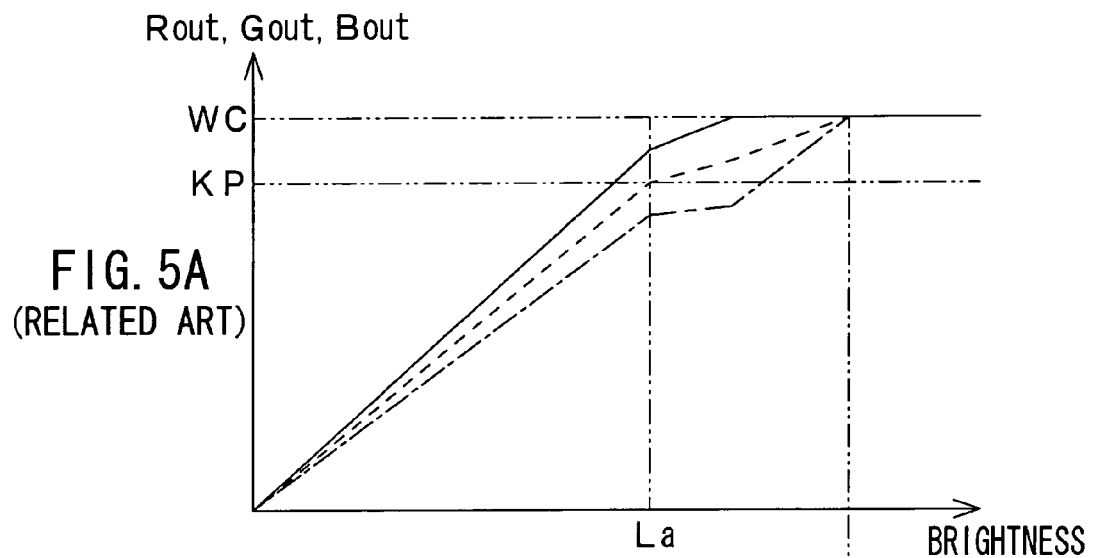
FIG. 5A is a diagram for showing characteristics of a video-signal-processing device in accordance with related art and FIG. 5B is a diagram for showing characteristics of another video-signal-processing device in accordance with related art.
Figure 5B:
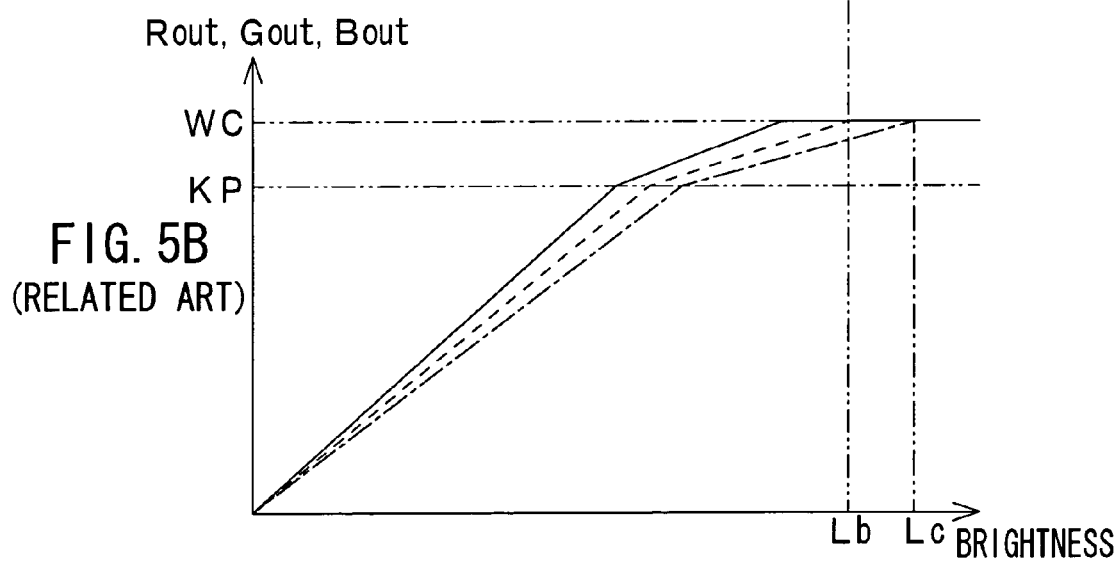

FIG. 14A shows the three primary-color signals Rck1, Gck1, and Bck1 when the mixture ratio rs is set to "0". If the mixture ratio rs is set to "0", the mixed signal YDMINin output from the mixing circuit 261 in the compression ratio adjustment circuit 260 becomes equal to the luminance signal Yin. Therefore, a quotient by the divider 262 becomes "(Yin/Yin)=1", so that the compression ratio KSu becomes equal to the above compression ratio KS. In other words, since the luminance signal Yyk1 is equal to the luminance signal Yyk output from the luminance Knee correction circuit 22 of related art, the same characteristics as those of related art are obtained if the mixture ratio rs is set to "0" (see FIGS. 5A and 14A).

Therefore, when the brightness is at a level L1 or higher and if the luminance signal Yin generated by using the three primary-color signals Rin, Gin, and Bin has the Knee point level KP or higher, the luminance signal Yin is compressed at the above compression ratio KS to generate a luminance signal Yyk1. Furthermore, the three primary-color signals Rin, Gin, and Bin are compressed at the luminance adjustment compression ratio KY1(=Yyk1/Yin), so that the three primary-color signals Ryk1, Gyk1, and Byk1 are generated with the hue being kept constant.

Then, if the brightness reaches a level L2 and the color signal Ryk1 exceeds the white clip level WC, level conversion is performed with the hue being kept constant by using the saturation compression ratio KC (=KA or 1). When the brightness reaches a level L3, an image having no saturation is provided.

FIG. 14B shows the three primary-color signals Rck1, Gck1, and Bck1 when the mixture ratio rs is set to "1". If the mixture ratio rs is set to "1", the mixed signal YDMINin output from the mixing circuit 261 in the compression ratio adjustment circuit 260 becomes equal to the minimum value signal DMINin (=Bin). Accordingly, the mixture ratio-adjustment coefficient HS obtained from the divider 262 becomes "HS=(DMINin/Yin)", so that the multiplier 263 multiplies the compression ratio KS by (DMINin/Yin). In this case, the minimum value signal DMINin has been selected as the lowest level one among the three primary-color signals Rin, Gin, and Bin and so is smaller in level than the luminance signal Yin. Therefore, the post-compression ratio adjustment compression ratio KSt is smaller than the compression ratio KS. It is to be noted that if the compression ratio KSt is smaller than the compression ratio lower limit LIM, the compression ratio restriction circuit 272 uses the compression ratio lower limit LIM as the compression ratio KSu.

Thus, when the brightness is at a level L1 or higher and if the luminance signal Yin obtained by using the three primary-color signals Rin, Gin, and Bin reaches the Knee point level KP or higher, luminance Knee correction is performed by using the compression ratio KSu obtained through multiplying the compression ratio KS by (DMINin/Yin), to generate a luminance signal Yyk1. Accordingly, the luminance adjustment compression ratio KY1 becomes smaller than the case where the mixture ratio rs is set to "0" and the three primary-color signals Ryk1, Gyk1, and Byk1 whose hues are kept constant have a smaller gradient than the case where the mixture ratio rs is set to "0". It is to be noted that since the mixed signal YDMINin output from the mixing circuit 261 is equal to the minimum value signal DMINin, the luminance adjustment compression ratio KY1 varies in accordance with the saturation or the hue.

Consequently, the brightness at which the color signal Ryk1 reaches the white clip level WC extends to a level L11, which is higher in brightness than level L2 in the case where the mixture ratio rs is set to "0". When the brightness is at level L11 or higher and if the color signal Ryk1 exceeds the white clip level WC, a saturation component of each signal is multiplied by the saturation compression ratio KC, so that any level conversion can be performed on them with the hue being kept constant. When the brightness reaches level L12, which is higher in brightness than level L3, an image having no saturation is provided.

By thus setting the luminance adjustment compression ratio KY1 by using the minimum value signal DMINin, it is possible to leave a saturation in condition where the hue is kept constant even if a background of a subject to be imaged is too bright. Further, by adjusting the mixture ratio rs, it is possible to adjust the brightness at which a saturation disappears within a range between level L3 and level L12.

Figure 15:
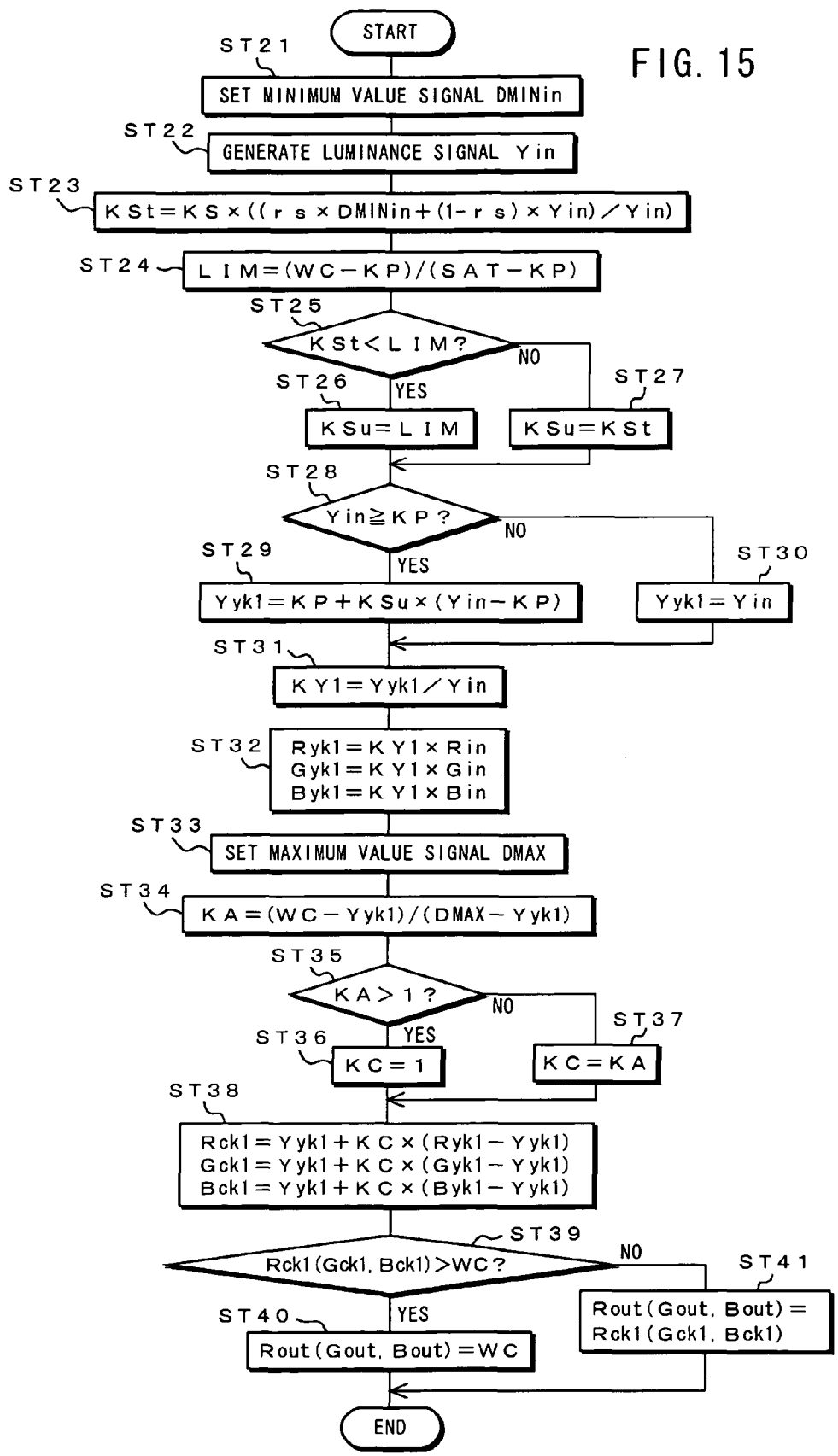
FIG. 15 is a flowchart of operation process of the second embodiment of the Knee correction processing according to the invention by executing the software in the system as shown in FIG. 9.

FIG. 15 is a flowchart of the operation process for the Knee correction processing as the second embodiment thereof by executing the software in the system 500 as shown in FIG. 9. At step ST21, the CPU 511 sets a minimum value signal DMINin by using the three primary-color signals Rin, Gin, and Bin and the process goes to step ST22.

At the step ST22, the CPU 511 generates a luminance signal Yin. In generation of the luminance signal, the CPU 511 performs computations indicated by the above Equations (10) and (11) by using the three primary-color signals Rin, Gin, and Bin, to generate the luminance signal Yin.

At step ST23, the CPU 511 performs the same computations as those of the above Equation (22) to calculate the compression ratio KSt. At step ST24, the CPU 511 performs the same computations as those of the above Equation (23) to calculate the compression ratio lower limits LIM.

At step ST25, the CPU 511 determines whether the compression ratio KSt is smaller than the compression ratio lower limit LIM. If the compression ratio KSt is smaller than the compression ratio lower limit LIM, at step ST26, the CPU 511 sets the compression ratio lower limit LIM as the compression ratio KSu and the process goes to step ST28. On the other hand, if the compression ratio KSt is not smaller than the compression ratio lower limit LIM, at step ST27, the CPU 511 sets the compression ratio KSt as the compression ratio KSu and the process goes to the step ST28.

At the step ST28, the CPU 511 determines whether the luminance signal Yin stays in the Knee point level KP or higher. If it stays in the Knee point level KP or higher, the process goes to step ST29 and, otherwise, the process goes to step ST30.

At the step ST29, the CPU 511 performs the same computations as the above Equation (12) to calculate a luminance signal Yyk1 and the process goes to step ST31. At the step ST30, the CPU 511 sets the luminance signal Yin as the luminance signal Yyk1 and the process goes to step ST31.

At the step ST31, the CPU 511 divides the luminance signal Yyk1 by the luminance signal Yin to calculate the luminance adjustment compression ratio KY1.

At step ST32, the CPU 511 multiplies the three primary-color signals Rin, Gin, and Bin by the luminance adjustment compression ratio KY1 to generate three primary-color signals Ryk1, Gyk1, and Byk1.

Processing of these steps ST21 through ST32 enables generation of the three primary-color signals Ryk1, Gyk1, and Byk1 on which level compression has been performed at the luminance adjustment compression ratio.

At step ST33, the CPU 511 sets a maximum value signal DMAX based on the three primary-color signals Ryk1, Gyk1, and Byk1 and the process goes to step ST34.

At the step ST34, the CPU 511 performs the same computations as the above Equation (6) to calculate a compression ratio KA and the process goes to step ST35

At the step ST35, the CPU 511 determines whether the compression ratio KA is larger than "1". If it is decided that the compression ratio KA is larger than "1", the process goes to step ST36. Otherwise, the process goes to step ST37.

At step ST36, the CPU 511 sets the saturation compression ratio KC to "1" and the process goes to step ST38. Further, at the step ST37, the CPU 511 sets the compression ratio KA to the saturation compression ratio KC and the process goes to step ST38.

At the step ST38, the CPU 511 performs any level conversion through the same computations as the above step ST13, thereby generating the three primary-color signals Rck1, Gck1, and Bck1. At the step ST38, the saturation compression ratio KC is equal to the compression ratio KA or "1". Processing of these steps ST33 through ST38 enables performing of level conversion on the three primary-color signals on which level compression has been performed at the saturation compression ratio.

At step ST39, the CPU 511 determines whether the color signal Rck1 exceeds the white clip level WC. If the color signal Rck1 exceeds the white clip level WC, the process goes to step ST40 where the white clip level WC is set to the color signal Rout. If no color signal Rck1 exceeds the white clip level WC, the process goes to step ST41 where the color signal Rck1 is set to the one of the three primary-color signal Rout. Further, the same processing of the steps ST39 through ST41 is performed also on the color signals Gck1 and Bck1.

In such a manner, in the level compression on the three primary-color signals Rin, Gin, and Bin at the luminance conversion section 200a, a lowest level one of the three primary-color signals Rin, Gin, and Bin is selected as the minimum value signal DMINin, so that based on a level ratio between this minimum value signal DMINin and the luminance signal Yin, the luminance adjustment compression ratio KY1 varies. In other words, the luminance adjustment compression ratio KY1 varies in accordance with the saturation or the hue and is used in level compression, thereby enabling a saturation remaining with the hue being kept constant even if a background of a subject to be imaged is too bright. Further, based on the luminance signal Yin and the mixed signal YDMINin obtained by mixing the minimum value signal DMINin and the luminance signal Yin, the mixture ratio-adjustment coefficient HS is set, and the mixture ratio rs of the minimum value signal DMINin and the luminance signal Yin is set by the control section 160 in accordance with the operation control signal US from the user interface section 165. Accordingly, for example, if the user changes the mixture ratio rs, as shown in FIGS. 13A and 13B, the brightness at which a saturation disappears can be adjusted within a range between level L3 and level L3-2.

Furthermore, relative to a color having a high luminance and/or saturation, a brightness at which the color signal reaches the white clip level WC can be increased. For example, as shown in FIGS. 13A and 13B, a brightness at which the color signal Rck1 reaches the white clip level WC can be moved from level L2 to level L2-1. This prevents a color having a high luminance and/or saturation from being saturated rapidly.

The following will describe a third embodiment of the Knee correction processing section as the video-signal-processing device. According to the third embodiment, when a luminance conversion section performs any level compression on the three primary-color signals, a saturation remains by setting a brightness at which the level compression starts in accordance with a saturation or a hue even if a background of a subject to be imaged is too bright. Further, it enables adjustment of a brightness at which a saturation remains, by using a mixture ratio rp. It is to be noted that the third embodiment covers also a case where a luminance adjustment compression ratio can be set in accordance with a saturation or a hue.

Figure 16:
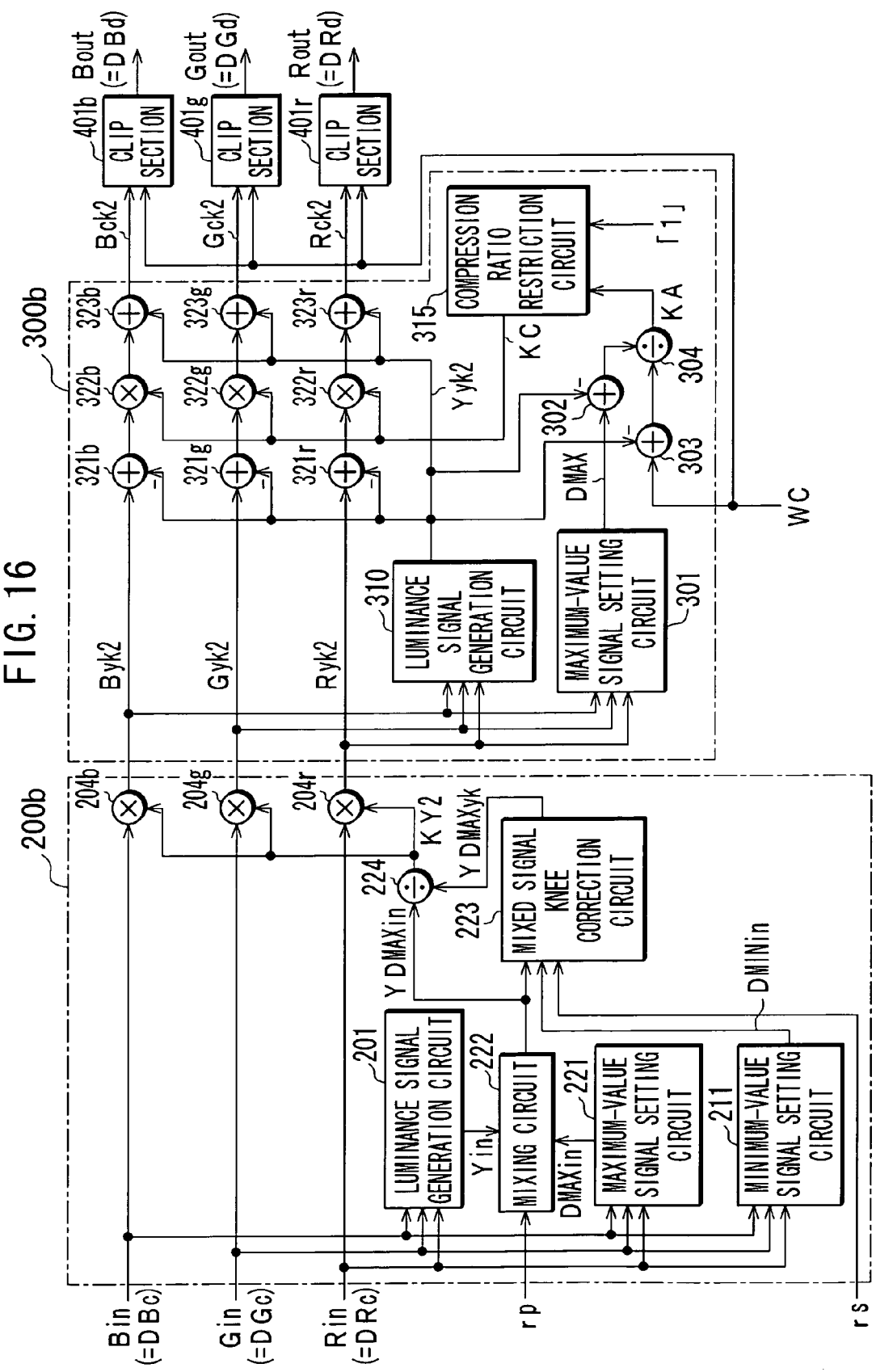
FIG. 16 is a diagram for showing a configuration of a third embodiment of the video-signal-processing device according to the invention.

FIG. 16 shows a configuration of the third embodiment of the Knee correction processing section as the video-signal-processing device. It is to be noted that in FIG. 16, elements corresponding to those in FIGS. 7 and 11 are indicated by the same symbols and numerals, detailed description of which will be omitted.

A luminance signal generation circuit 201 in a luminance conversion section 200b receives three primary-color signals Rin, Gin, and Bin and generates a luminance signal Yin based on the three primary-color signals Rin, Gin, and Bin. The luminance signal generation circuit 201 supplies the luminance signal Yin to a mixing circuit 222. A minimum-value signal setting circuit 211 receives three primary-color signals Rin, Gin, and Bin and sets a lowest level one of these primary-color signals as a minimum value signal DMINin. The minimum-value signal setting circuit 211 supplies this minimum value signal DMINin to a mixed signal Knee correction circuit 223.

A maximum-value signal setting circuit 221 receives three primary-color signals Rin, Gin, and Bin and determines a highest level one from among the three primary-color signals Rin, Gin, and Bin. The maximum-value signal setting circuit 221 supplies this determined color signal as a maximum value signal DMAXin to the mixing circuit 222.

The mixing circuit 222 is supplied with a mixture ratio rp. The mixing circuit 222 mixes the luminance signal Yin and the maximum value signal DMAXin at a mixture ratio rp to generate a mixed signal YDMAXin. The mixing circuit 222 a; supplies the mixed signal YDMAXin to a mixed signal Knee correction circuit 223 and a divider 224. For example, the mixing circuit 222 generates the mixed signal YDMAXin based on following Equation (24).

$$YDMAXin = rp*DMAXin + (1-rp)*Yin \qquad (24)$$

The mixed signal Knee correction circuit 223 is configured in the same manner as the above-described luminance Knee correction circuit 212. The mixed signal Knee correction circuit 223 performs the same processing as that of the luminance Knee correction circuit 212 by using the mixed signal YDMAXin in place of the luminance signal Yin, thus generating a mixed signal YDMAXyk. Further, the mixed signal Knee correction circuit 223 supplies the generated mixed signal YDMAXyk to the divider 224. It is to be noted that if the mixed signal YDMAXin is used, a compression ratio KSt indicated in the above Equation (22) is the same as that indicated in following Equation (25).

$$KSt = KSs*((rs*DMINin+(1-rs)*YDMAXin)/YDMAXin) \qquad (25)$$

The divider 224 divides the mixed signal YDMAXyk by the mixed signal YDMAXin and supplies a quotient thereof as a luminance adjustment compression ratio KY2 to multipliers 204r, 204g, and 204b. The multiplier 204r multiplies the color signal Rin with the luminance adjustment compression ratio KY2 to generate a color signal Ryk2. Similarly, the multipliers 204g and 204b multiply the color signals Gin and Bin, respectively, by the luminance adjustment compression ratio KY2 to generate color signals Gyk2 and Byk2, respectively.

Like the luminance Knee correction circuit 212, the mixed signal Knee correction circuit 223 performs Knee correction on the mixed signal YDMAXin by using a compression ratio KSu varied in accordance with a saturation or a hue, thereby generating the mixed signal YDMAXyk. This allows the luminance adjustment compression ratio KY2 to vary in accordance with the saturation or the hue. Further, since the mixed signal YDMAXin is obtained by mixing the maximum value signal DMAXin and the luminance signal Yin, a level at which level compression starts in accordance with the saturation or the hue also varies.

The color signal Ryk2 obtained through the level compression is supplied to a maximum-value signal setting circuit 301, a subtracter 321r, and a luminance signal generation circuit 310 in a saturation conversion section 300b. Similarly, the color signals Gyk2 and Byk2 obtained through the level compression are respectively supplied to the maximum-value signal setting circuit 301, the subtracters 321g and 321b, and the luminance signal generation circuit 310 in the saturation conversion section 300b.

The maximum-value signal setting circuit 301 receives the three primary-color signals Ryk2, Gyk2, and Byk2 and determines a highest level one of them. The maximum-value signal setting circuit 301 supplies this determined color signal as a maximum value signal DMAX to a subtracter 302.

Further, a signal output from the mixed signal Knee correction circuit 223 is the mixed signal YDMAXyk on which the Knee correction has been performed while the luminance conversion section 200b generates no luminance signal on which the level compression has been performed. Therefore, the luminance signal generation circuit 310 uses the three primary-color signals Ryk2, Gyk2, and Byk2 to generate a luminance signal Yyk2 used when performing any level conversion in the saturation conversion section 300b. Further, the luminance signal generation circuit 310 supplies the generated luminance signal Yyk2 to the subtracters 302, 303, 321r, 321g, and 321b and adders 323r, 323g, and 323b.

These subtracters 302 and 303 and a divider 304 are used to calculate a compression ratio KA. A compression ratio restriction circuit 315 then restricts it to "1" or less. The compression ratio restriction circuit 315 then supplies the restricted one as a saturation compression ratio KC to multipliers 322r, 322g, and 322b.

The following will describe characteristics of the third embodiment of the Knee correction processing section as the video-signal-processing device with reference to FIGS. 17A to 17C. It is to be noted that to simplify explanation, in FIGS. 17A to 17C, one Knee point level KP is provided to set the corresponding compression ratio as the above compression ratio KS.

FIG. 17A shows the three primary-color signals Ryk2, Gyk2, and Byk2 when the mixture ratios rp and rs are respectively set to "0". If the mixture ratio rp is set to "0", the mixed signal YDMAXin output from the mixing circuit 222 becomes equal to the luminance signal Yin. If the mixture ratio rs is set to "0", on the other hand, the mixed signal YDMINin output from a mixing circuit 261 in a compression ratio adjustment circuit 260 of the mixed signal Knee correction circuit 223 becomes equal to the mixed signal YDMAXin, that is, the luminance signal Yin.

Therefore, the mixture ratio-adjustment coefficient HS generated by the compression ratio adjustment circuit 260 becomes equal to "1" and the compression ratio KSu becomes equal to the above compression ratio KS.

Thus, if the mixture ratios rp and rs are each set to "0" when the brightness reaches level L1 or higher and the luminance signal Yin reaches the Knee point level KP, the luminance conversion section 200b starts any level compression. Further, if the brightness reaches level L2, the color signal Ryk2 reaches the white clip level WC, so that the saturation conversion section 300b performs the level conversion with a hue being kept constant. If the brightness reaches level L3, an image having no saturation is provided.

FIG. 17B shows the three primary-color signals Ryk2, Gyk2, and Byk2 when the mixture ratio rp is set to "0" and the mixture ratio rs is set to "1". Since the mixture ratio rp is set to "0", the mixed signal YDMAXin output from the mixing circuit 222 to the mixed signal Knee correction circuit 223 is equal to the luminance signal Yin. Therefore, if the brightness reaches level L1 or higher and the luminance signal Yin reaches the Knee point level KP or higher, the luminance conversion section 200b starts any level compression.

Since the mixture ratio rs is set to "1", in the compression ratio adjustment circuit 260 of the mixed signal Knee correction circuit 223, the mixed signal YDMINin output from the mixing circuit 261 becomes equal to the minimum value signal DMINin, so that the mixture ratio-adjustment coefficient HS becomes (DMINin/Yin). Thus, the compression ratio KS is multiplied by (DMINin/Yin). If the multiplied compressed ratio KS is larger than the compression ratio lower limit LIM, this compression ratio KS multiplied by (DMINin/Yin) provides a compression ratio KSu. Thus, the mixed signal YDMAXin, that is, the luminance signal Yin is compressed by the compression ratio KSu. In such a manner, if the mixture ratio rs is set to "1", the compression ratio KSu in the mixed signal Knee correction circuit 223 becomes smaller than that of a case where the mixture ratio rs is set to "0" by (DMINin/Yin).

In this case, the multipliers 204r, 204g and 204b multiply the three primary-color signals Rin, Gin, and Bin, respectively, by the luminance adjustment compression ratio KY2 obtained as a result of division by the divider 224 to generate three primary-color signals Ryk2, Gyk2, and Byk2. Therefore, slopes of the three primary-color signals Ryk2, Gyk2, and Byk2 at the time when the brightness exceeds the level L1 are more moderate than those when the mixture ratio rs is set to "0".

Consequently, a brightness at which any one of the three primary-color signals Ryk2, Gyk2, and Byk2 reaches the white clip level WC is higher than that in a case shown in FIG. 17A. For example, a brightness at which the color signal Ryk2 reaches the white clip level WC is level L2-1, which is higher than level L2 in a case where the mixture ratio rs is set to "0". Furthermore, also a brightness at which an image based on the three primary-color signals Rout, Gout, and Bout loses a saturation is level L3-1, which is higher than level L3 in a case where the mixture ratio rs is set to "0".

FIG. 17C shows the three primary-color signals Ryk2, Gyk2, and Byk2 when the mixture ratios rp and rs are each set to "1". If the mixture ratio rp is set to "1", the mixed signal YDMAXin output from the mixing circuit 222 becomes equal to the maximum value signal DMAXin.

Since the mixed signal YDMAXin is equal to the maximum value signal DMAXin, if the brightness level reaches level L0 or higher and the maximum value signal DMAXin reaches the Knee point level KP or higher, the mixed signal Knee correction circuit 223 performs any compression processing on the maximum value signal DMAXin.

Further, since the mixture ratio rs is set to "1", in the compression ratio adjustment circuit 260, the mixture ratio-adjustment coefficient HS becomes equal to (DMINin/DMAXin). Therefore, the multiplier 263 multiplies the compression ratio KS by (DMINHin/DMAXin). If the multiplied compression ratio KS is larger than the compression ratio lower limit LIM, this compression ratio KS multiplied by (DMINin/DMAXin) provides a compression ratio KSu. The mixed signal YDMAXin, that is, the maximum value signal DMAXin is compressed by the compression ratio KSu.

In such a manner, if the mixture ratio rp is set to "1", level compression is performed on the three primary-color signals Rin, Gin, and Bin in accordance with the maximum value signal DMAXin, so that a brightness at which level compression starts becomes lower than that in a case where the mixture ratio rp is set to "0", that is, level compression is performed on the basis of the luminance signal Yin. Thus, a level at which level compression starts varies in accordance with a saturation or a hue.

Further, if the mixture ratio rs is set to "1", the luminance adjustment compression ratio KY2 becomes smaller than that of a case where the mixture ratio rs is set to "0". Therefore, a brightness at which any one of the three primary-color signals Ryk2, Gyk2, and Byk2 reaches the white clip level WC, for example, a brightness at which the color signal Ryk2 having a highest level reaches the white clip level WC is level L2-2, which is even higher than level L2-1 in the case shown in FIG. 17B. Therefore, when any one of the three primary-color signals Ryk2, Gyk2, and Byk2 has reached the white clip level WC and then, level conversion is triggered in the saturation conversion section 300b, a brightness at which an image based on the three primary-color signals Rout, Gout, and Bout loses a saturation is level L3-2, which is even higher than the level L3-1 in the case shown in FIG. 17B.

By thus setting the luminance adjustment compression ratio KY2 by using the maximum value signal DMAXin or the minimum value signal DMINin, it is possible to leave a saturation with a hue being kept constant even if a background of a subject to be imaged is too bright. Further, by adjusting the mixture ratios rp and rs, it is possible to adjust the brightness at which a saturation disappears within a range between level L3 and level L3-2.

Figure 18:
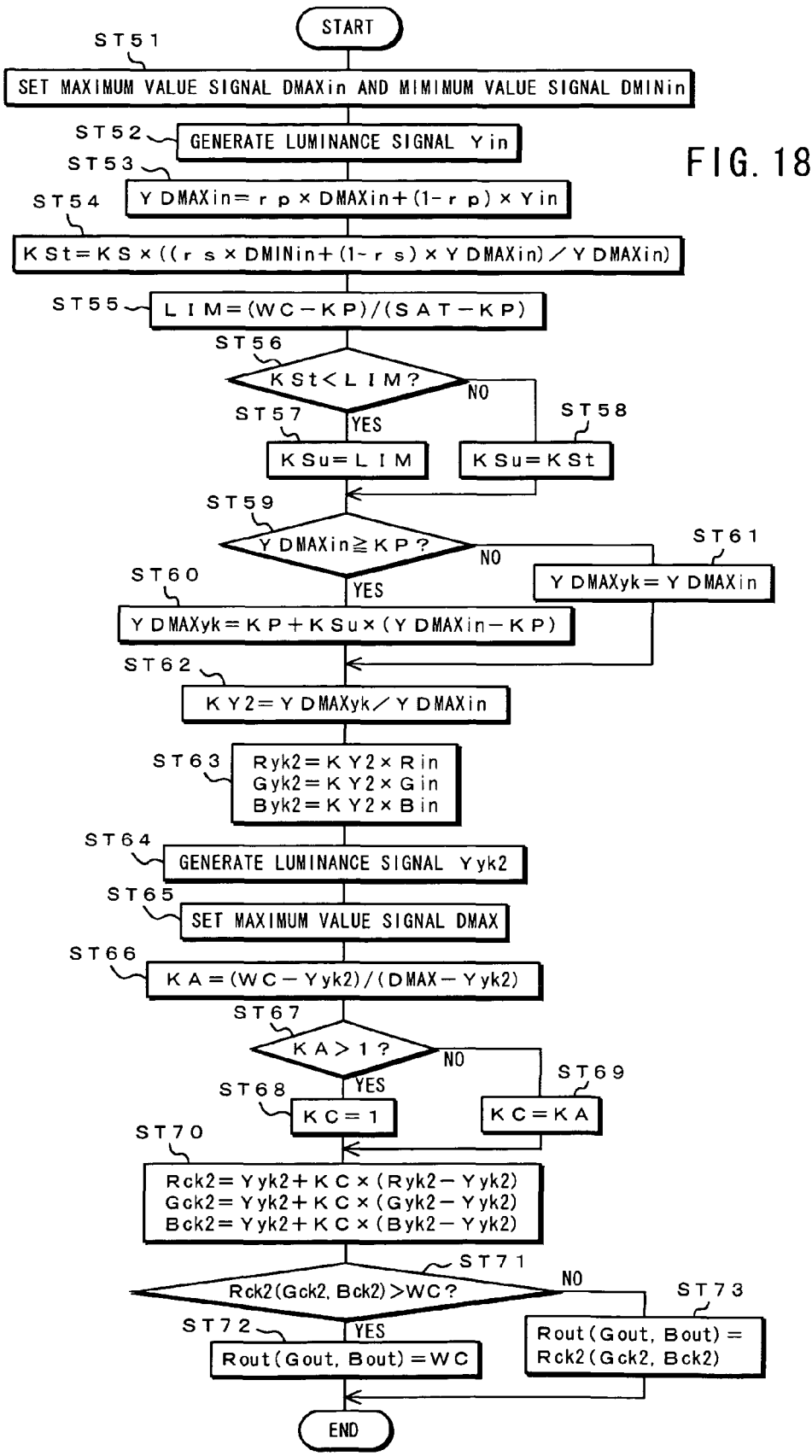
FIG. 18 is a flowchart of operation process of the third embodiment of the Knee correction processing according to the invention by executing the software in the system as shown in FIG. 9.

FIG. 18 is a flowchart of the operation process for the Knee correction processing as the third embodiment thereof by executing the software in the system 500 as shown in FIG. 9. At step ST51, the CPU 511 sets a maximum value signal DMAXin and a minimum value signal DMINin, respectively, by using the three primary-color signals Rin, Gin, and Bin and the process goes to step ST52.

At the step ST52, the CPU 511 generates a luminance signal Yin. In generation of the luminance signal, the luminance signal generation circuit 201 performs computations indicated by the above Equations (10) and (11) by using the three primary-color signals Rin, Gin, and Bin, thereby generating the luminance signal Yin.

At step ST53, the CPU 511 performs computations of the above Equation (24) to generate the mixed signal YDMAXin.

At step ST54, the CPU 511 performs the same computations as those of the above Equation (25) to calculate the compression ratio KSt. At step ST55, the CPU 511 performs computations of the above Equation (23) to calculate the compression ratio lower limit LIM.

At step ST56, the CPU 511 determines whether the compression ratio KSt is smaller than the compression ratio lower limit LIM. If the compression ratio KSt is smaller than the compression ratio lower limit LIM, at step ST57, the CPU 511 sets the compression ratio lower limit LIM as the compression ratio KSu and the process goes to step ST59. On the other hand, if the compression ratio KSt is not smaller than the compression ratio lower limit LIM, at step ST58, the CPU 511 sets the compression ratio KSt as the compression ratio KSu and the process goes to step ST59.

At the step ST59, the CPU 511 determines whether the mixed signal YDMAXin is at the Knee point level KP or higher. If it is at the Knee point level KP or higher, the process goes to step ST60 and, otherwise, the process goes to step ST61.

At the step ST60, the CPU 511 performs the same computations as the above Equation (12) to perform level compression on the mixed signal YDMAXin, thereby calculating the mixed signal YDMAXyk. At the step ST61, the CPU 511 sets the mixed signal YDMAXin as the mixed signal YDMAXyk and the process goes to step ST62.

At the step ST62, the CPU 511 divides the mixed signal YDMAXyk by the mixed signal YDMAXin to calculate the luminance adjustment compression ratio KY2.

At step ST63, the CPU 511 multiplies the three primary-color signals Rin, Gin, and Bin with the luminance adjustment compression ratio KY2 to generate three primary-color signals Ryk2, Gyk2, and Byk2. Processing of these steps ST51 through ST63 enables generation of the three primary-color signals on which level compression has been performed at the luminance adjustment compression ratio.

At step ST64, the CPU 511 generates a luminance signal Yyk2 by using the three primary-color signals Ryk2, Gyk2, and Byk2 and the process goes to step ST65.

Steps ST66 through ST74 correspond to the above-described steps ST33 through ST41. Thus, the CPU 511 performs processing of steps ST66 to ST74 to generate the three primary-color signals Rout, Gout, and Bout. It is to be noted that processing of steps ST64 to ST70 enables performing of level conversion on the three primary-color signals on which level compression has been performed at a saturation compression ratio.

In such a manner, in the level compression on the three primary-color signals Rin, Gin, and Bin at the luminance conversion section 200b, a highest level one of the three primary-color signals Rin, Gin, and Bin is selected as the maximum value signal DMAXin, so that based on a mixed signal YDMAXin obtained by mixing this maximum value signal DMAXin and the luminance signal Yin, level compression is started in the luminance conversion section 200b. In other words, the start of level compression varies in accordance with the saturation or the hue, and level compression is performed at a brightness level lower than a case where level compression is started on the basis of, for example, the luminance signal Yin, so that it is possible to shift to a higher level the brightness at which any one of the three post-level compression primary-color signals Ryk2, Gyk2, and Byk2 reaches the white clip level WC. Therefore, it is possible to leave a saturation with a hue being kept constant even if a background of a subject to be imaged is too bright. Further, the mixture ratio rp of the maximum value signal DAMXin and the luminance signal Yin in the case of generating the mixed signal YDMAXin is set by the control section 160 in accordance with an operation control signal US from the user interface section 165. Accordingly, for example, if the user changes the mixture ratio rp, as shown in FIGS. 17A to 17C, the brightness at which level compression starts can be adjusted within a range between level L0 and level L1.

Furthermore, according to this embodiment, it is possible to make variable the luminance adjustment compression ratio in accordance with a level ratio between the minimum value signal DMINin and the luminance signal Yin. For example, when the user changes the mixture ratio rs between this minimum value signal DMINin and the luminance signal Yin, it is possible to adjust the brightness at which a saturation disappears within a range between level L3 and level L3-2 as shown in FIGS. 17A to 17C.

Further, since the hue is kept constant even if the luminance signal exceeds the Knee point level, an image seems to give no funny feeling even when the Knee point level is set to a point that is lowered to a brightness of a face of a person etc. By increasing the compression ratio (Knee slope) when the Knee point level is set to a lower point, a bright portion can have a sufficient level of contrast.

Although in the above embodiments, a case has been described in which the color signal Rin has a highest level and the color signal Bin has a lowest level, of course, level compression and level conversion can be performed in accordance with a saturation or a hue when carrying out the same processing as the above even if any other color signal has the highest level or the lowest level.

It should be understood by those skilled in the art that various modifications, combinations, sub-combinations and alterations may occur depending on design requirements and other factors insofar as they are within the scope of the appended claims or the equivalents thereof.

What is claimed is:
1. A video-signal-processing device comprising:
   luminance conversion means for performing level compression on three input primary-color signals of a color video signal at a same luminance adjustment compression ratio with a hue and a saturation of the color video signal being kept constant, thereby generating three compressed primary-color signals; and
   saturation conversion means for performing level conversion on the three compressed primary-color signals by using a saturation compression ratio if a maximum level of at least one of the three compressed primary-color signals exceeds a first level, wherein the saturation conversion means sets the saturation compression ratio by using a minimum level one of the three compressed primary-color signals.

2. The video-signal-processing device according to claim 1, wherein the saturation conversion means sets the saturation compression ratio to allow a saturation of the color video signal represented by the three compressed primary-color signals obtained after the level conversion to disappear when the minimum level one of the three compressed primary-color signals reaches the first level.

3. The video-signal-processing device according to claim 2, wherein the saturation conversion means mixes the minimum level one of the three compressed primary-color signals with a luminance signal generated by using the three compressed primary-color signals; and wherein, if the signal mixed with this luminance signal reaches the first level, the saturation conversion means sets the saturation compression ratio to allow the saturation of the color video signal represented by the three compressed primary-color signals after the level conversion to disappear.

4. The video-signal-processing device according to claim 3, further comprising:

mixture ratio setting means for setting a mixture ratio between the minimum level one of the three compressed primary-color signals and the luminance signal.

5. A video-signal-processing device comprising:

a luminance conversion section that performs level compression on three input primary-color signals of a color video signal at a same luminance adjustment compression ratio with a hue and a saturation of the color video signal being kept constant, thereby generating three compressed primary-color signals; and a saturation conversion section that performs level conversion on the three compressed primary-color signals by using a saturation compression ratio if a maximum level of at least one of the three compressed primary-color signals exceeds a first level, wherein the saturation conversion section sets the saturation compression ratio by using a minimum level one of the three compressed primary-color signals.

6. An imaging apparatus comprising:

imaging means for generating three primary-color signals;

luminance conversion means for performing level compression on three input primary-color signals of a color video signal at a same luminance adjustment compression ratio with a hue and a saturation of the color video signal being kept constant, thereby generating three compressed primary-color signals; and saturation conversion means for performing level conversion on the three compressed primary-color signals by using a saturation compression ratio if a maximum level of at least one of the three compressed primary-color signals exceeds a first level, wherein the saturation conversion means sets the saturation compression ratio by using a minimum level one of the three compressed primary-color signals.

7. An imaging apparatus comprising:

an imaging section that generates three primary-color signals;

a luminance conversion section that performs level compression on three input primary-color signals of a color video signal at a same luminance adjustment compression ratio with a hue and a saturation of the color video signal being kept constant, thereby generating three compressed primary-color signals; and a saturation conversion section that performs level conversion on the three compressed primary-color signals by using a saturation compression ratio if a maximum level of at least one of the three compressed primary-color signals exceeds a first level, wherein the saturation conversion section sets the saturation compression ratio by using a minimum level one of the three compressed primary-color signals.

8. A method, implemented on a video-signal-processing device, for processing a video signal, the method comprising:

performing, at the video-signal-processing device, level compression on three input primary-color signals of a color video signal at the same luminance adjustment compression ratio with a hue and a saturation of the color video signal being kept constant, thereby generating three compressed primary-color signals;

setting, at the video-signal-processing device, a saturation compression ratio by using a minimum level one of the three compressed primary-color signals; and performing, at the video-signal-processing device, level conversion on the three compressed primary-color signals by using the saturation compression ratio if a maximum level of at least one of the three compressed primary-color signals exceeds a first level.

9. A non-transitory computer readable storage medium having instructions recorded thereon for causing a computer to execute a method comprising:

performing level compression on three input primary-color signals of a color video signal at the same luminance adjustment compression ratio with a hue and a saturation of the color video signal being kept constant, thereby generating three compressed primary-color signals;

setting a saturation compression ratio by using a minimum level one of the three compressed primary-color signals; and performing level conversion on the three compressed primary-color signals by using the saturation compression ratio if a maximum level of at least one of the three compressed primary-color signals exceeds a first level.

* * * * *